United States Patent
Ono

(10) Patent No.: US 6,876,762 B1
(45) Date of Patent: Apr. 5, 2005

(54) APPARATUS FOR IMAGING AND IMAGE PROCESSING AND METHOD THEREOF

(75) Inventor: Shuji Ono, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 709 days.

(21) Appl. No.: 09/708,582

(22) Filed: Nov. 9, 2000

(30) Foreign Application Priority Data

Nov. 11, 1999 (JP) .......................................... 11-321701

(51) Int. Cl.$^7$ ................................................ G06K 9/00
(52) U.S. Cl. ........................ 382/154; 345/419; 356/12
(58) Field of Search ........................ 382/154; 345/419, 345/420, 421, 422, 423, 424, 426, 427, 6, 425; 356/12, 16, 17, 18; 250/559.04, 599.05, 599.08, 599.38

(56) References Cited

U.S. PATENT DOCUMENTS

| | | | | |
|---|---|---|---|---|
| 5,173,865 A | * | 12/1992 | Koike et al. | 702/155 |
| 5,621,866 A | * | 4/1997 | Murata et al. | 345/422 |
| 6,008,945 A | * | 12/1999 | Fergason | 359/630 |
| 6,480,192 B1 | * | 11/2002 | Sakamoto et al. | 345/419 |
| 6,525,699 B1 | * | 2/2003 | Suyama et al. | 345/6 |

FOREIGN PATENT DOCUMENTS

| | | | |
|---|---|---|---|
| JP | 06-167564 | * | 6/1994 |
| JP | B2-2611173 | | 5/1997 |
| JP | 11-248431 | * | 9/1999 |

* cited by examiner

*Primary Examiner*—Samir Ahmed
(74) *Attorney, Agent, or Firm*—Birch, Stewart, Kolasch & Birch, LLP

(57) ABSTRACT

Imaging apparatus for obtaining depth information of an object to be imaged. An image capturing part for obtaining three or more parallactic or steroscopic images of the object as viewed from three or more different viewpoints which are not arrayed on the same line; a displacement detector for detecting plural displacements with respect to a specific region of the object, each displacement being detected between any two of the three or more steroscopic images; and a depth calculator for calculating the depth information with respect to the specific region, based on the plural displacements detected by the displacement detector.

33 Claims, 27 Drawing Sheets

APPARATUS FOR IMAGING AND IMAGE PROCESSING AND METHOD THEREOF

This patent application claims priority based on a Japanese patent application, H11-321701, filed on Nov. 11, 1999, the contents of which are incorporated herein by reference.

BACKGROUND OF THE INVENTION

1. Field of the Invention

The present invention relates to imaging apparatus, image processing unit, method thereof and recording medium for determining the depth of an object to be imaged. More specifically, the present invention relates to apparatus and method thereof for obtaining information as to the depth of an object based on parallactic images of the object.

2. Description of the Related Art

In order to obtain information about the location of an object, a method known as a parallactic imaging is used, which is based on a model of stereo-viewing by two human eyes. In this, two cameras are arrayed so that parallactic images viewed from two different points are obtained, and the depth is thereby measured. The displacement of the images of the object is detected because of the difference between the viewpoints, so that the distance from the camera to the object can be calculated by the triangulation principle using the displacement of the images and the focus length of the lens of the camera. In this, Japanese Patent No. 2611173, issued on Feb. 27, 1997, discloses a method in which the position of a moving object is determined using at least three imaging devices.

However, even when two cameras are used, due to a limit of the angle of vision of their lenses, the dead angle or "blind spot" of the parallactic images is in the direction of the moving object. Therefore, it is difficult to accurately determine depth information of an object through a wide visual field. Furthermore, according to the method disclosed by the aforementioned Japanese Patent No. 2611173, at least three imaging devices are required so as to establish the coordinates of the moving object. As a result, the devices and equipment become too large and complex, and the calculation costs are too high.

SUMMARY OF THE INVENTION

Therefore, in order to overcome the above-described and other problems of the related art, it is an object of the present invention to provide image capturing apparatus, image processing unit, method thereof and recording medium which obtain information about the depth of an object through a wide visual scope. This object is achieved by combinations described in the independent claims. The dependent claims define further advantageous and exemplary combinations of the present invention.

According to a first aspect of the invention, in order to achieve objects of the invention, an image capturing apparatus is provided for obtaining a depth information of an object to be captured. The image capturing apparatus includes: an image capturing section for capturing three or more parallactic images of the object viewed from three or more different viewpoints which are not arrayed in an identical line; a displacement detector for detecting plural displacements with respect to a specific region of the object, each displacement coming out between any two of the three or more stereoscopic or parallactic images; and a depth calculator for calculating the depth information with respect to the specific region, based on the plural displacements detected by the displacement detector.

Preferably, the depth calculator has ratios for consideration of the plural displacements to calculate the depth information, and changes, for each specific region of the object, the consideration ratios.

The depth calculator, more preferably, changes the consideration ratios, depending on an azimuth of the specific region of the object viewed from near the center position of the three or more viewpoints.

More preferably, the depth calculator gives a smaller consideration ratio to the displacement detected between a particular pair from the three or more parallactic images viewed from a corresponding pair from the three or more viewpoints if the specific region of the object is nearer a direction of a line being drawn between the particular pair of the viewpoints, and the depth calculator gives a larger consideration ratio to the displacement detected between the particular pair from the three or more parallactic images viewed from the corresponding pair from the three or more viewpoints if the specific region is nearer a plane which includes a middle point of a line segment drawn between the particular pair of the viewpoints and is perpendicular to the line segment between the particular pair of the viewpoints.

Furthermore, if an angle of the azimuth of the specific region of the object is smaller than 30 degrees viewed from a middle point between a particular pair from the three or more viewpoints, the depth calculator, preferably, calculates the depth information based on the displacement detected between the corresponding parallactic images viewed from the particular pair of the viewpoints.

Preferably, the viewpoints comprise just three viewpoints, and the three viewpoints form or define a regular triangle.

The image capturing section may include three or more optical lenses having a wide visual angle and being located at the respective three or more viewpoints which are not arrayed in the same line, for capturing the three or more parallactic images by the three or more optical lenses. More preferably, the viewpoints may comprise just three viewpoints, and the three viewpoints may form a regular triangle.

Furthermore, the image capturing section may include: an optical lens having a wide visual angle; and a driver for making the optical lens move to the three or more viewpoints which are not arrayed in the same line, wherein the image capturing section captures the three or more parallactic images when the driver makes the optical lens move to the three or more viewpoints. More preferably, the driver makes the optical lens move so as for a movement locus of the optical lens to draw or define a circle, and wherein the three or more viewpoints are located on the circle of the movement locus. More preferably, the viewpoints comprise just three viewpoints located on the circle of the movement locus, the three viewpoints form a regular triangle.

Still further, the image capturing section may include: two optical lenses positioned at different two of the three or more viewpoints, each of the optical lenses having a wide visual angle; and a driver for making either one of the two optical lenses move to another one of three or more viewpoints which does not stand in or lie on a line that is drawn between the different two viewpoints, wherein the image capturing section captures the parallactic images of the object by the two optical lenses and, when the driver makes the either one of the two optical lenses move, captures the other parallactic image. Preferably, the other viewpoint at which the driver makes the either of the two optical lenses move is the third viewpoint, and the two viewpoints before moving and the third viewpoint form a regular triangle.

Preferably, each of the optical lenses has an optical axis, and all directions of the optical axes of the optical lenses at the three or more viewpoints are identical. More preferably, the optical lenses comprise fish-eye lenses, and to the depth calculator calculates the depth information through the whole azimuth of the object captured by the fish-eye lenses of the image capturing section.

According to a second aspect of the invention, an image processing apparatus is provided for obtaining a depth information of an object to be imaged. The image processing apparatus includes: an input unit for inputting three or more parallactic images of the object viewed from the three or more viewpoints which are not arrayed in an identical line; a displacement detector for detecting plural displacements with respect to a specific region of the object, each of the displacements coming out between two of the three or more parallactic images; and a depth calculator for calculating the depth information of the specific region of the object, wherein ratios for consideration of the plural displacements are changed with respect to the specific region.

The image processing apparatus may further comprise: an image transformer for transforming the images of the object inputted by the input unit, wherein the image transformer subjects the images to a coordinates transformation based on the depth calculated by the depth calculator with respect to the specific region of the object.

Preferably, if the image inputted by the input unit is a whole azimuth image captured by a fish-eye lens, the image transformer transforms the whole azimuth image into a perspective projection image by the coordinates transformation. More preferably, the image transformer generates an orthogonal projection image of the object by the coordinates transformation.

According to a third aspect of the invention, an image processing method is provided for obtaining a depth information of an object to be imaged. The method includes the steps of: inputting three or more parallactic images of the object viewed from three or more different viewpoints which are not arrayed in an identical line; detecting plural displacements with respect to a specific region of the object, each of the displacements coming out between any two of the three or more parallactic images; and calculating the depth information of the specific region of the object, wherein ratios for consideration of the plural displacements are changed with respect to the specific region.

According to a fourth aspect of the invention, a recording medium is provided storing a computer program for obtaining a depth information of an object to be imaged. The recording medium includes: an input module for inputting three or more parallactic images of the object viewed from three or more different viewpoints which are not arrayed in an identical line; a displacement detecting module for detecting plural displacements with respect to a specific region of the object, each of the displacements coming out between any two of the three or more parallactic images; and a depth calculating module for calculating the depth information of the specific region of the object, wherein ratios for consideration of the plural displacements are changed with respect to the specific region.

This summary of the invention does not necessarily describe all necessary features or functions of the present invention. The present invention may also be a sub-combination of the above described features and functions.

DETAILED DESCRIPTION OF THE INVENTION

The invention will now be described based on the preferred embodiments, which is not intended to limit the scope of the present invention, but to exemplify the invention. All of the features and the combinations thereof described in the embodiments are not necessarily essential to the invention.

First Embodiment

Figure 1:
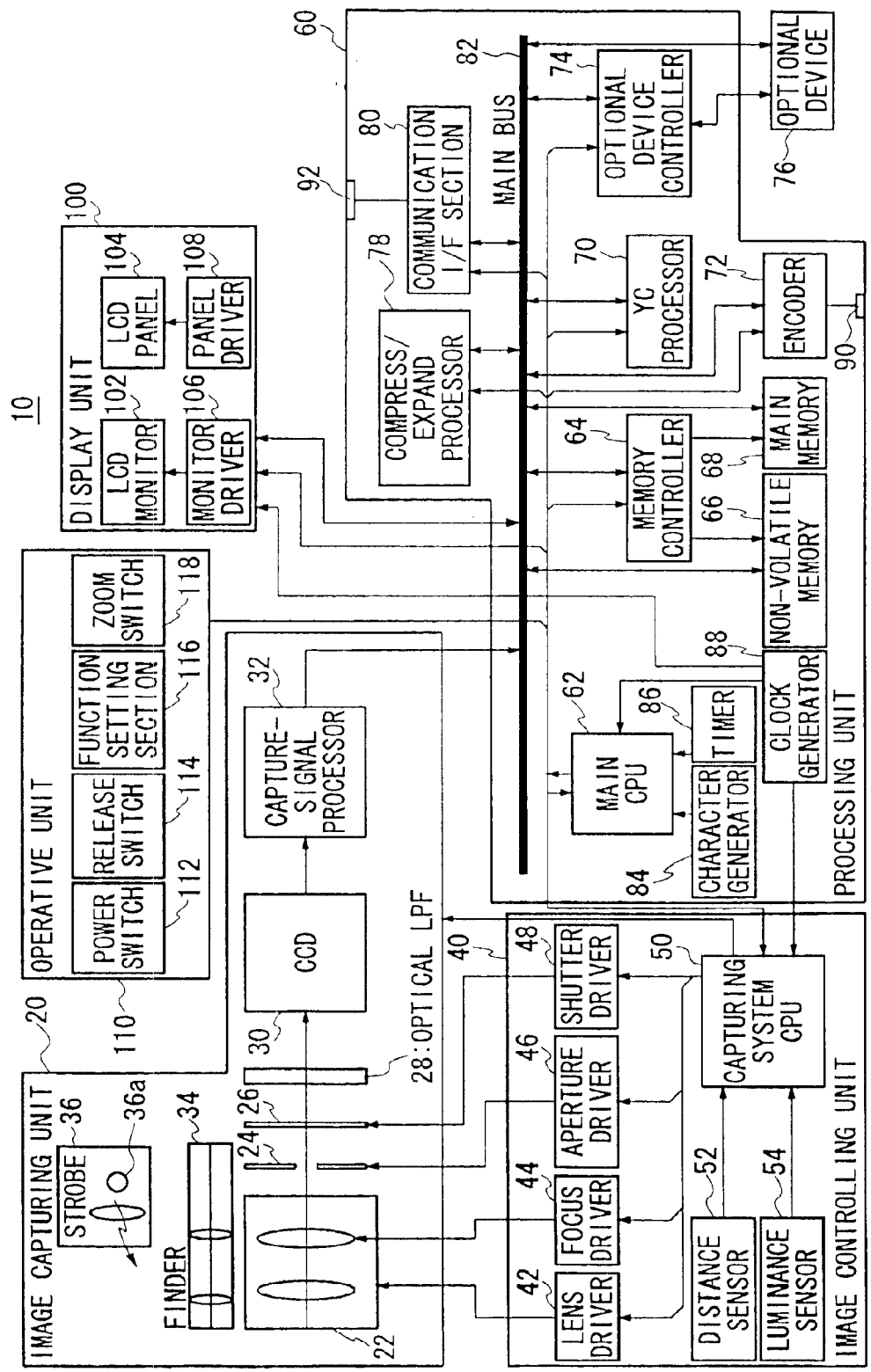
FIG. 1 shows schematically a digital camera as an example of an image capturing apparatus in accordance with the present invention.

FIG. 1 shows schematically a digital camera 10 as an example of an image capturing apparatus in accordance with the present invention. The digital camera 10 includes devices such as a digital still camera, a digital video camera which is able to capture a still image, and the like. The digital camera 10 has an image capturing unit 20, an image controlling unit 40, a processing unit 60, a display unit 100 and an operative unit 110.

The image capturing unit 20 includes mechanical members and electric members for capturing and forming images. The image capturing unit 20 has a lens section 22 which pick up images and processes the same, an aperture 24, a shutter 26, an optical LPF (low pass filter) 28, a CCD (charge-coupled device) 30 serving as a solid imaging device, and a capture-signal processor 32. The lens section 22 comprises a focusing lens and a zooming lens. The structure described above forms an image of an object on a light receiving surface of the CCD 30. The electrical charge, corresponding to the luminous intensity, is charged in each of the sensor elements (not shown) of the CCD 30. The electrical charge thus charged, which is read out to a shift register via lead gate pulses, is read out as a voltage signal via sequential register transmitting pulses.

Because the digital camera 10 generally has an electronic shutter function, a mechanical shutter is not necessary. To achieve the electronic shutter function, a shutter drain is provided with the CCD 30 through a shutter gate. Upon driving the shutter gate, the electric charge thus charged is drained into the shutter drain. Control of the shutter gate can provide control of the time of charging the electric charge into the sensor elements, i.e. the shutter speed.

The voltage signal, which is an analog signal, is decomposed by the capture-signal processor 32 into R, G and B components, and the white balance is subjected to adjustment. Then, the capture-signal processor 32 carries out Gamma correction, subjects the R, G and B signals to A/D conversion in order with the necessary timings, and outputs the resultant digital image data thus obtained (hereinafter "digital image data") to the processing unit 60.

The image capturing unit 20 further includes a finder 34 and a strobe 36. The finder 34 may have an LCD (not shown) and, in this case, it is possible to display various information from a main CPU (described later) within the finder 34. The strobe 36 works with a discharge tube 36a that emits light when energy charged in a capacitor (not shown) is supplied to the discharge tube 36a.

An image controlling unit 40 has a lens driver 42, a focus driver 44, an aperture driver 46, a shutter driver 48, a capturing system CPU So for controlling these elements, a distance sensor 52, and a luminance sensor 54. Each of the drivers, such as the lens driver 42, includes a driving means having a stepping motor, or the like. In response to activating a release switch 114 (described later), the distance sensor 52 measures the distance to the object, and the luminance sensor 54 measures the luminance intensity of the object. The distance data thus measured (hereinafter "distance data") and the luminance intensity data of the object (hereinafter "luminance data") are sent to the capturing system CPU 50. The capturing system CPU 50 controls the lens driver 42 and the focus driver 44, based on a capturing information about a zooming magnification and so on designated by a user, so as to adjust the zooming magnification and the focusing of the lens section 22. Moreover, the capturing system CPU 50 controls the lens driver 42 to change the position of the lens section 22, so as to captures parallactic images.

The capturing system CPU 50 determines an aperture amount and a shutter speed, based on the integrated value of the RGB digital signals for one image frame, i.e. the AE information. According to the information thus determined, the aperture driver 46 and the shutter driver 48 perform the adjustment of the aperture amount and the opening/closing of the shutter 26, respectively.

Based on the luminance data, the capturing system CPU 50 further controls the light emission of the strobe 36 as well as adjusts the aperture amount of the aperture 26. When the user captures the image of an object, the CCD 30 starts charging the electric charge. And after the shutter time period calculated by the luminance data elapses, the electric charge thus charged is outputted to the capture-signal processor 32.

The processing unit 60 has a main CPU 62 which controls the digital camera 10, especially the processing unit 60 itself. A memory controller 64, a YC processor 70, an optional device controller 74, a compress/expand processor 78 and a communication I/F section, also are controlled by the main CPU 62. The main CPU 62 communicates with the capturing system CPU 50 about necessary information via serial communication. The operative clock of the main CPU 62 is a clock generator 88. The clock generator 88 also provides respective clocks having different frequencies to the capturing system CPU 50 and the display unit 100.

The main CPU 62 provides a character generator 84 and a timer 86. The timer 86 is backed up with a battery, and is always counting the date and time. According to the data thus counted, the date and time and other time information about the captured image are given to the main CPU 62. The character generator 84 generates characters such as the date and time, and title of the captured image, and these characters are suitably superimposed on the captured image.

The memory controller 64 controls a non-volatile memory 66 and a main memory 68. The non-volatile memory 66 has an EEPROM (electrically erasable and programmable ROM), a FLASH memory, or the like, and stores data such as the user's setting information and adjustment made at shipping, which have to be maintained even during power-off of the digital camera 10. The non-volatile memory 66 may stores a boot program of the main CPU 62 or a system program, as may be the case. The main memory 68 generally comprises a relatively inexpensive and large-capacity memory, such as a DRAM. The main memory 68 serves as a frame memory, a system memory loading various programs, and a working area. The non-volatile memory 66 and the main memory 68 communicate data with other parts inside or outside the processing unit 60 through a main bus 82.

The YC processor 70 subjects the digital image data to YC transformation, and generates a luminance signal Y and color difference (chroma) signals B-Y and R-Y. The memory controller 64 temporarily stores the luminance signal and the chroma signals in the main memory 68. The compress/expand processor 78 reads out the luminance signal and the chroma signals, and compresses these signals. The data thus compressed (hereinafter "compressed data") are written down on a memory card, a kind of optional device 76, via the optional device controller 74.

The processing unit 6b further has an encoder 72. The encoder 72 receives the luminance signal and the chroma signals, transforms these signals to video signals (NTSC or PAL signals), and outputs the transformed signals through a video output terminal 90. In case that a video signal is generated from data recorded on the optional device 76, this data are first brought to the compress/expand processor 78 through the optional device controller 74. Subsequently, the data, which are subjected to suitable expansion at the compress/expand processor device 78, are transformed into a video signal by the encoder 72. Conforming to the signal specification recognized by the optional device(s) 76 and the bus specification of the main bus 82, the optional device controller 74 executes required signal generation, logical conversion, voltage transformation, or the like. The digital camera 10 may support optional devices 76 other than a memory card, such as a standard I/O card conforming to the PCMCIA. In this case, the optional device controller 74 may comprise a bus controlling LSI for PCMCIA.

The communication I/F section 80 regulates protocol conversion corresponding to communication standards which are supported by the digital camera 10, such as USB, RS-232C, Ethernet, Bluetooth and IrDA. The communication I/F section 80 includes, if necessary, a driver IC, and communicates with external devices including a network through a connector 92. Other than such standard communication features, data may also be transferred with external devices such as a printer, a Karaoke device, a game equipment, or in use with their own interface.

The display unit 100 has an LCD monitor 102 and an LCD panel 104 controlled, respectively, by a monitor driver 106 and a panel driver 108, serving as LCD drivers. The LCD monitor 102, having a two inch size for instance, is generally mounted on the back of the camera, and displays either a capturing mode or a playback mode of an image, a zooming magnification at capturing or playback of an image, a battery residual amount, date and time, a screen for setting up modes, an object image and so on. The LCD panel 104, having a small monochrome LCD for instance, is typically provided on an upper side of the camera, and displays information such as image quality (FINE/NORMAL/BASIC, for instance), strobe on/off, the number of capturable images in a normal mode, the number of pixel, battery capacity, etc.

The operative unit 110 includes mechanisms and electrical members which are necessary for a user to provide instructions for operation of the camera 10 or to set up modes thereof. A power switch 112 establishes the electric power-on or -off of the digital camera 10. The release switch 114 has a two-step operating mechanism, that is, a half activation and a full activation. For instance, the half activation lets the AF and AE lock, and the full activation captures an image and the data, after processing and compressing, is recorded on the main memory 68 or the optional device(s) 76. The operative unit 110 may also accept set up instructions by use of other means than the switches described above, such as rotary mode dials, ten-keys, and, in FIG. 1, a generic name "a function setting section 116" is given to these options. Examples of the operative unit 110 functions are "file format", "special effects", "printing", "decide/save", "switching displays", etc. A zooming switch 118 provides a zooming magnification.

The operation of the arrangement described above is now described. First, the power switch 112 of the digital camera 10 is turned on, and electric power is supplied to the camera 10. The main CPU 62 retrieves the settings of the function setting section 116, and the main CPU 62 determines whether the digital camera 10 is in the capturing mode or the playback mode.

During the capturing mode, the main CPU 62 monitors for the half activation of the release switch 114. When the half activation is detected, the main CPU 62 acquires the luminance data and the distance data from the luminance sensor 54 and the distance sensor 52, respectively. Based on the data thus acquired, the image controlling unit 40 operates and carries out various adjustments, such as the focusing and the aperture amount of the lens section 22. Upon completing the adjustments, the LCD monitor 102 displays a message, such as "standby" for instance, notifying the completion of adjustments to the user, and then monitors for the full activation of the release switch 114. When the release switch 114 is fully activated, the shutter 26 closes after the predetermined shutter time, and the electric charge charged in the CCD 30 is drained into the capture-signal processor 32. The digital image data, which are generated as a result of processing at the capture-signal processor 32, are outputted to the main bus 82. The digital image data are temporarily stored in the main memory 68, and the data are subjected to processing under the YC processor 70 and the compress/expand processor 78, and are recorded on the optional device 76 by way of the optional device controller 74. The image thus recorded is displayed on the LCD monitor for a certain period with freezing, so that the user can review the captured image. Then, the capturing operations are concluded.

When the digital camera 10 is in the playback mode, the main CPU 62 reads out the last captured image from the main memory 68 through the memory controller 64, and displays the last image on the LCD monitor 102 of the display unit 100. Then, if the user selects "forward feeding" or "backward feeding" at the function setting section 116, the next or previous captured image from the image previously displayed is read out and displayed on the LCD monitor 102.

Figure 2:
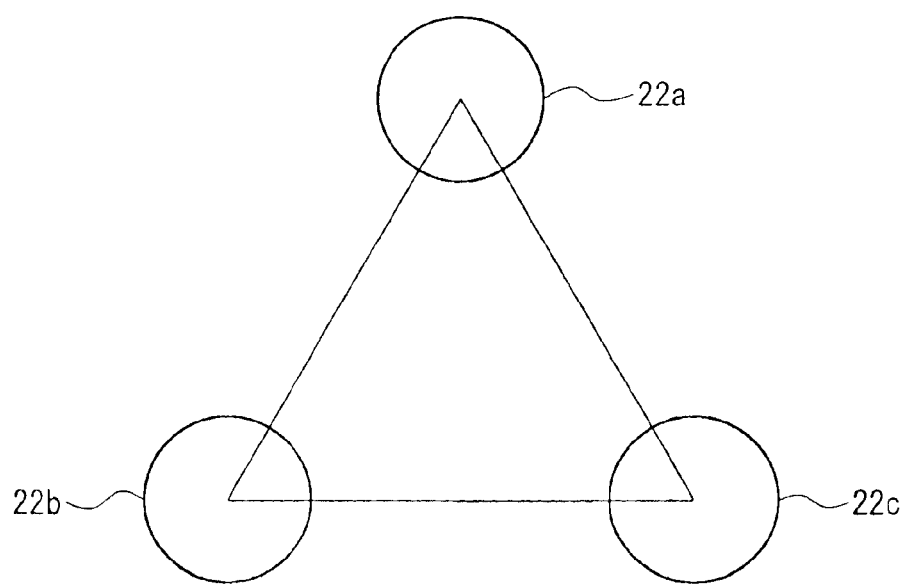
FIG. 2 shows a configuration of a lens section 22 of a image capturing unit 20 according to one embodiment of the present invention.

In the present embodiment, the image capturing unit 20 captures parallactic images of the object from three or more different viewpoints which do not lie along the same line. FIG. 2 shows an example of a configuration of the lens section 22 of the image capturing unit 20. This figure illustrates the lens section 22 as viewed from the front of the digital camera 10. The lens section 22 comprises three lenses 22a, 22b and 22c which are arranged at different viewpoints. In order to avoid the dead angle, as well as to image the object with a wide visual angle, these three lens 22a, 22b and 22c preferably are positioned at apexes of a regular triangle.

Preferably, the lens section 22 is an optical lens having a wide visual angle, and may be a wide lens or a fish-eye lens. More preferably, a fish-eye lens, which is designed such that its visual angle extends to 180 degree, is suitable for capturing an image of an object having a wide visual field. Further, the lens section 22 may be an optical system having plural optical lenses with a common optical axis.

Each of the lenses 22a, 22b and 22c may have an individual CCD 30 so that each of the individual CCDs 30 receives the light of the object to be image-formed by the corresponding one of the lenses 22a, 22b and 22c. On the other hand, the three lenses 22a, 22b and 22c also may have a common CCD 30 so that the common CCD receives all of the light of the object to be image-formed by these three lenses 22a, 22b and 22c.

The CCD 30 according to the present embodiment has solid imaging elements. The solid imaging element, which is an imaging element that is semiconducterized or integrated, has a structure such that a group of picture elements having photoelectric exchanging effect and the electrically charging function are arranged in two dimensions on a semiconductor substrate. The solid imaging element receives the light of the image being image-formed by the lens section 22, and charges the electric charge with the photoelectric exchanging effect. The electric image thus charged is scanned in a predetermined order, and read out as an electric signal.

The solid imaging element has a semiconductor element with a light receiving portion for receiving the external light and doing the photoelectric exchanging. The imaging element also has a housing for the semiconductor element, a transparent protective member arranged to face the packaged semiconductor element for enabling passage of light incident to the light receiving portion, and a light shielding member having a stronger light-shielding effect than the transparent protective member provided on the outside surface of or inside the transparent protective member. The structure described above can improve the quality of the captured image. Furthermore, the transparent protective member may have a micro-lens so that resolution of the formed image can be higher. A color filter may be provided between the light receiving portion and the transparent protective member, or on or inside the transparent protective member, so that a color image can be captured.

It is preferable that the CCD 30 according to the present embodiment be a one-dimensional image sensor (linear sensor) or a two-dimensional image sensor (area sensor), having a high enough resolution to accurately detect the displacement between the parallactic images. Instead of a CCD, either a MOS image sensor, CdS-Se contact image sensor, a-Si (amorphous silicon) contact image sensor or bipolar contact image sensor may serve as the solid imaging element.

Moreover, the lens section 22 may further include an optical system for capturing a main image in addition to the optical system for capturing parallactic images, and these optical systems may form an image of the object and parallactic images on two respective CCDs 30. The optical system for capturing the main image may have either a regular optical lens, or a wide lens or a fish-eye lens having a wide visual angle. The resolution or sensitivity of the CCD 30 for receiving the image from the main image capturing system may be different from that of the CCD 30 for receiving the image from the parallactic images capturing system.

Figure 3:
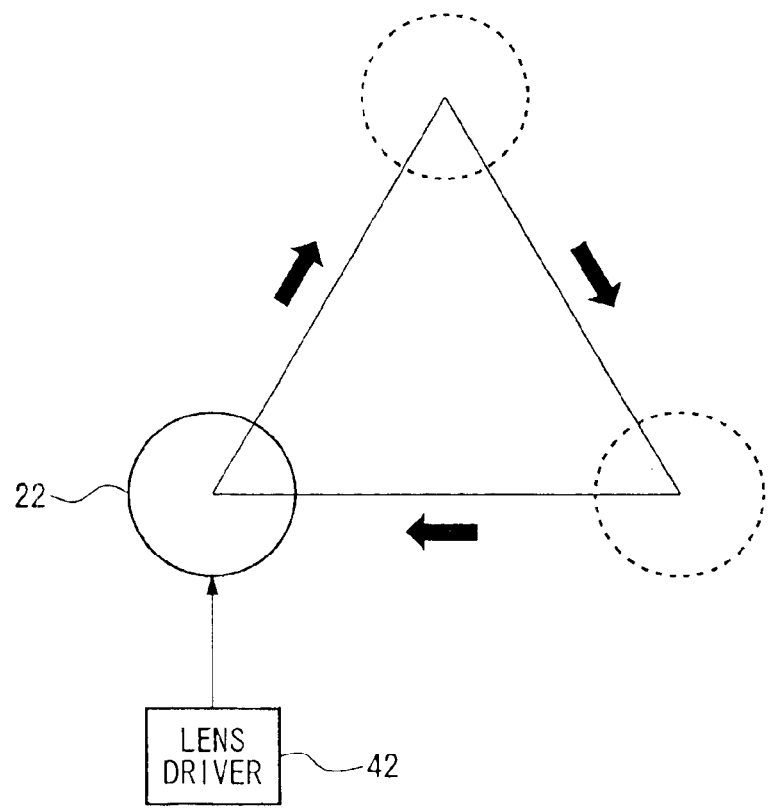
FIG. 3 shows another configuration of a lens section 22 of the image capturing unit 20 in accordance with the present invention.

FIG. 3 shows another example of a configuration of the lens section 22 of the image capturing unit 20. One lens 22 is provided such that a lens driver 42 makes the lens 22 move, and the lens 22 forms parallactic images, on the CCD 30, of an object viewed from different viewpoints. In order to image the object through wide angle as well as to avoid dead angle, the lens driver 42 preferably positions the lens 22 at apexes of a regular triangle.

Figure 4:
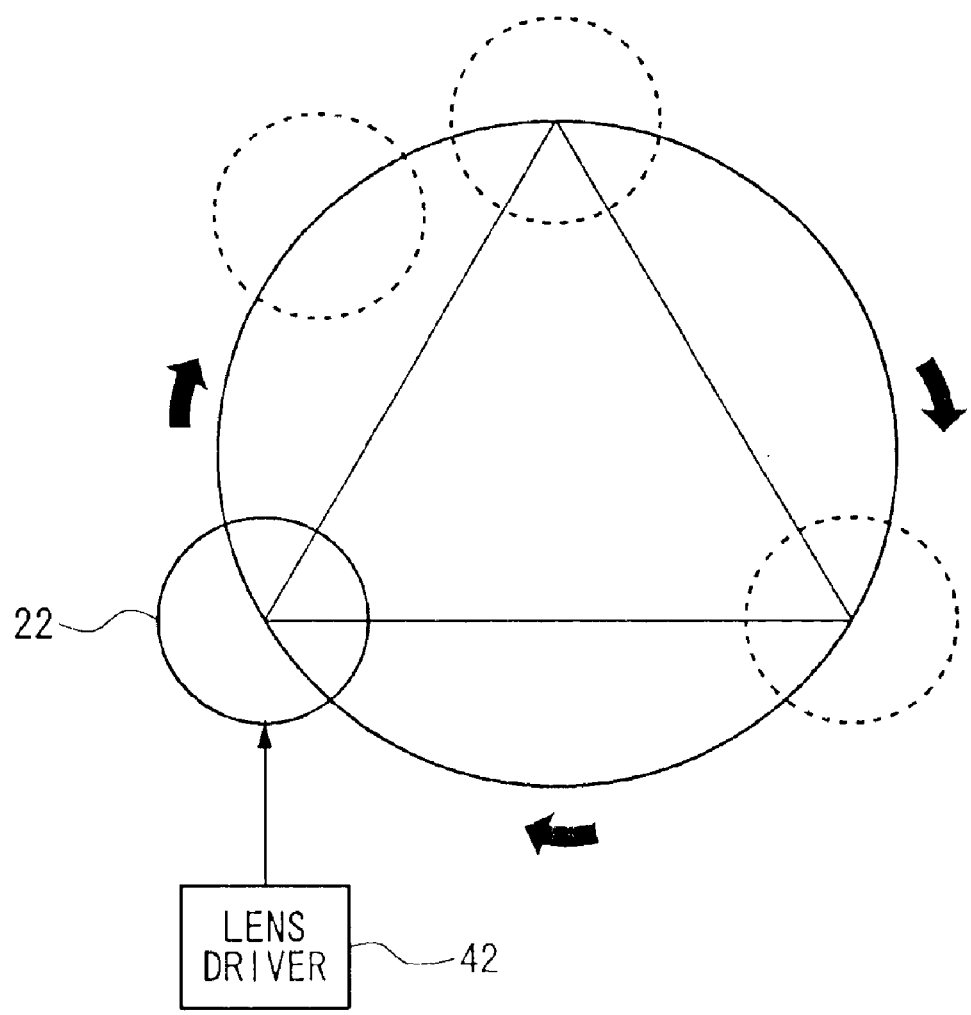
FIG. 4 shows yet another configuration of a lens section 22 of the image capturing unit 20.

FIG. 4 shows yet another example of a configuration of the lens section 22 of the image capturing unit 20. One lens 22 is provided such that the lens driver 42 makes the lens 22 move along a circular locus and stop at suitable positions on the circular locus, and the lens 22 forms parallactic images of an object, on the CCD 30, viewed from different viewpoints. In order to image the object through wide angle without dead angle, it is sufficient that the stopping positions of the lens section 22 be located at three apexes of a regular triangle which is inscribed in the circular locus. Accordingly, it is preferable that the lens driver 42 makes the lens 22 move along the circular locus, and stop at the apexes of the inscribed regular triangle therein to pick up the parallactic images. The fact that the movement locus of the lens 22 is a circle is suitable for using driving mechanisms such as a stepping motor for the lens driver 42.

Figure 5:
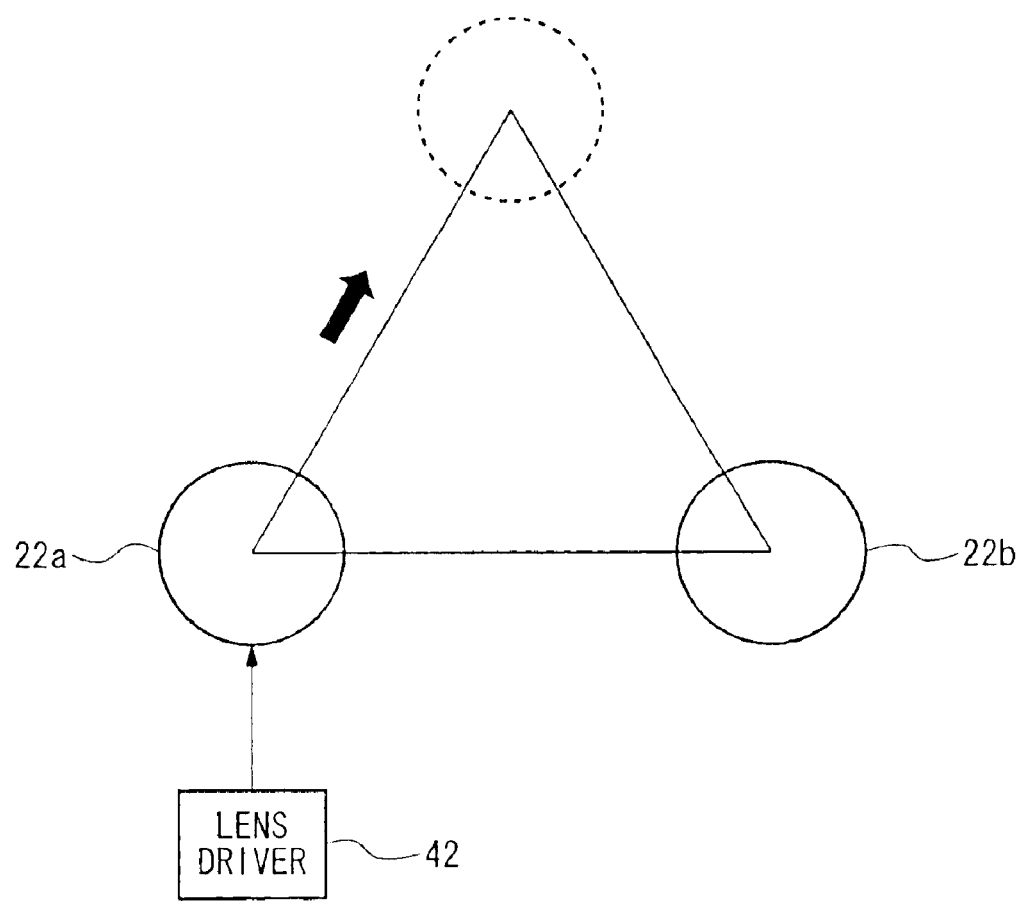
FIG. 5 shows yet another configuration of a lens section 22 of the image capturing unit 20.

FIG. 5 shows yet another example of a configuration of the lens section 22 of the image capturing unit 20. The lens section 22 has two lenses 22a and 22b which are arranged at different viewpoints. The two lenses 22a and 22b form parallactic images of an object, on the CCD 30, viewed from the different viewpoints. The lens driver 42 makes either one of the lenses 22a and 22b move, and a parallactic image of the object viewed from the third viewpoint is formed on the CCD 30. In order to image the object without dead angle, it is preferable that the position of either lens 22a or 22b after moving is not in the same line as defined by the positions of the lenses 22a and 22b before moving. Moreover, so as to image the object with wide angle as well as to avoid the dead angle, it is preferable that the lens driver 42 move either one of the lenses 22a and 22b such that the three viewpoints are located at apexes of a regular triangle. The fact that the movement locus of either one of the lenses 22a and 22b is a straight line is suitable for designing driving mechanisms such as a stepping motor for the lens driver 42.

Figure 6:
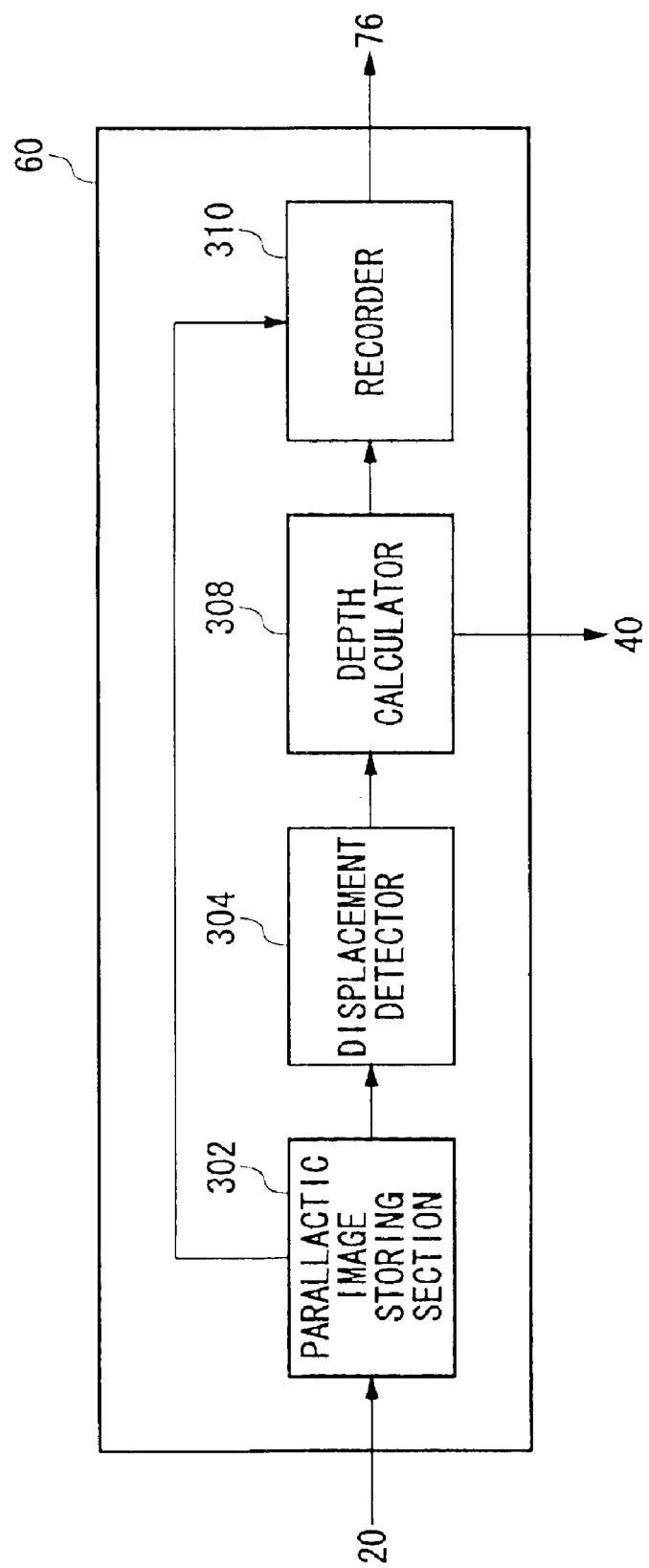
FIG. 6 is a block diagram of a processing unit 60 according to the present invention.

The processing unit 60 according to the present embodiment acquires the depth information of the object, based on the parallactic images captured by the image capturing unit 20. FIG. 6 is a block diagram showing a function of the processing unit 60. The processing unit 60 has a parallactic image storing section 302, a displacement detector 304, a depth calculator 308, and a recorder 310.

The parallactic image storing section 302 stores three or more parallactic images of the object captured by the lens section 22, viewed from three or more different viewpoints. The displacement detector 304 detects displacement amounts because of the parallax, each displacement amount coming out between any two images with respect to the respective regions from three or more parallactic images stored in the storing section 304. The plural displacement amounts are detected, corresponding to pairs for any two of the parallactic images.

The depth calculator 308 calculates a depth amount of the specific region of the object, based on the plural displacement amounts detected by the displacement detector 304. A method for calculating the depth amount will be described later. The displacement detector 304 and depth calculator 308 compute the depth amount of the object captured on the parallactic images, for the whole region or for a part thereof.

The depth calculator 308 may input the object depth information thus obtained to the image capture controlling unit 40, and the focusing, the aperture amount and the shutter speed may be adjusted such that the image capture controlling unit 40 controls, based on the depth information of the object, the focus driver 44, the aperture driver 46 and the shutter driver 48.

The recorder 310 records the depth information of the object calculated by the depth calculator 308 and the parallactic images of the object stored in the parallactic image storing section 302 on the optional device 76.

The functions of the displacement detector 304 and the depth calculator 308 of the processing unit 60 may be accomplished by, for instance, cooperation between the main CPU 62 shown in FIG. 1 and programs stored in or loaded on the main memory 68 or the non-volatile memory 66. In case the main CPU 62 has an internal memory, necessary programs may be housed in that memory, and functions may be carried out as firm wares. Alternatively, the parallactic data stored, in the parallactic image storing section 302 of the processing unit 60 may be stored in the main memory 68 or the non-volatile memory 66. Furthermore, the parallactic image data may be compressed by the compress/expand processor 78. The functions of the recorder 310 of the processing unit 60 may be achieved by, for example, the optional device controller 74. Moreover, the operative unit 110, which accepts the user's instructions may designate specific regions of the object images, and the depth calculator 308 may calculate the depth amount at the specific regions 80 designated by the user. The systems for achieving the functions described above have considerable flexibility in their design.

Figure 7:
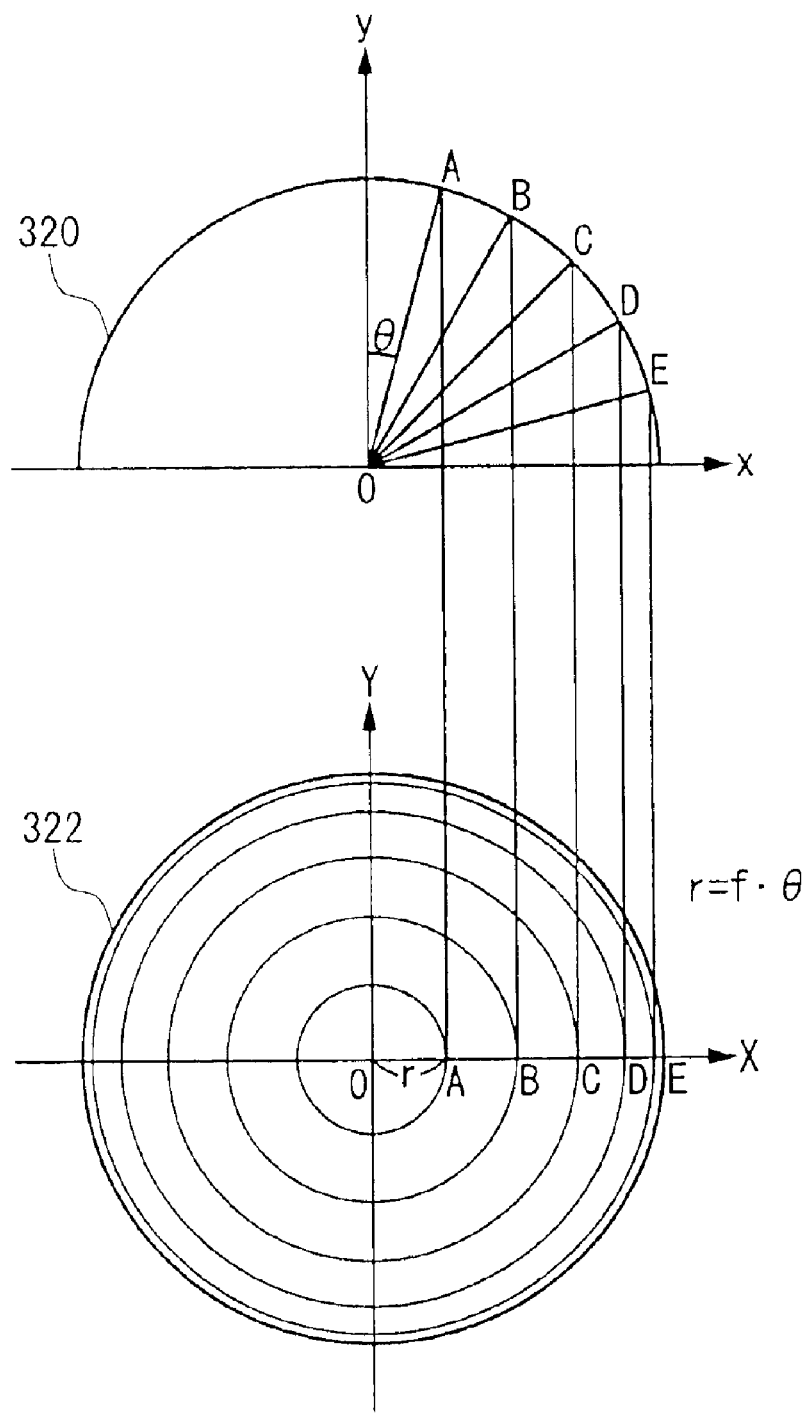
FIG. 7 shows the relationships between incident angles θ from points of an object whose image the fish-eye lens 320 forms and the coordinates of the points on the whole azimuth angle image 322 of the object.

The lens characteristics of a fish-eye lens, a preferred embodiment of the lens section 22, as an example of optical lenses having wide visual angle are now explained. Reference is made to FIG. 7 in explaining the relationship between incident angles θ from points of an object which the fish-eye lens 320 image-forms and the coordinates of points of the object image on the whole azimuth angle image 322. The center of the fish-eye lens 320 is located at the origin on the X-Y plane. An azimuth of a point of the object is represented by an incident angle θ made between the incident light from the point of the object to the fish-eye lens 320 and the optical axis of the fish-eye lens 320. The center of the whole azimuth image 322 is located at the origin on the X-Y plane. A position of the object image on the whole azimuth image 322 is represented by a distance r from the origin of the X-Y plane. This distance r is called an image height as well. If f stands for the focus length of the fish-eye lens, a position r of the object and the incident angle θ thereof have the relationship as follows: $r=f*\theta$.

As described above, the fish-eye lens, which has the visual angle of 180 degree, can image-form the whole azimuth angle of an object on an imaging plane. Especially, a fish-eye lens which is based on the formula, $r=f*\theta$, giving a lens relationship between a position r of the object and the incident angle θ thereof, is called an "fθ lens". Instead of the fθ lens, a fish-eye lens which is based on the formula, $r=f*\sin\theta$, giving a lens characteristic called an "f sin θ lens", may also serve as the lens section 22. Furthermore, it is sufficient to use any fish-eye lens in which a position r increases in sequence with respect to the incident angle θ of the position, and in which the whole azimuth of an object is image-formed on a finite position r Therefore, a suitable fish-eye lens is not limited to the fish-eye lenses having the characteristic of the fθ lens and the f sin θ lens. Advantageously, the fish-eye lens that is designed such that the visual angle extends to 180 degree is preferred for capturing an object having a wide visual field. However, to the extent that the visual angle of an optical lens is wide enough and the optical lens is able to capture the object image through a wide visual field, the lens section 22 is not limited to a fish-eye lens and a wide lens may be used.

Figure 8:
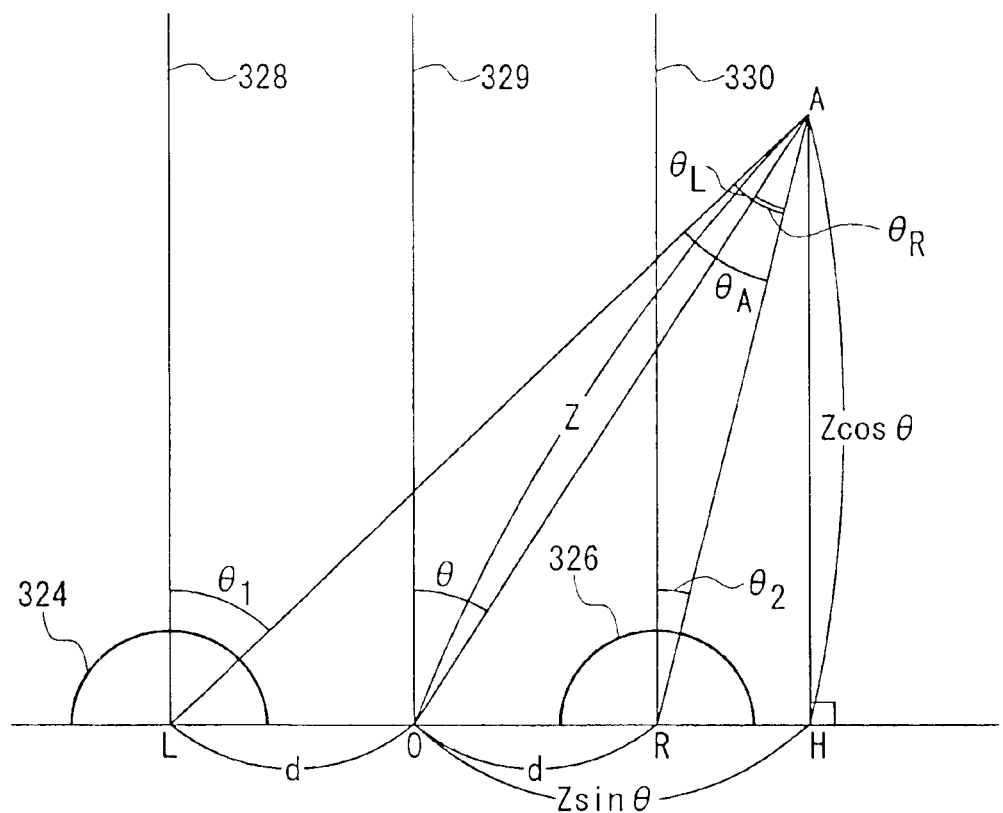
FIG. 8 shows the parallactic displacement caused when viewing an object with two fish-eye lenses.

Reference is made to FIG. 8 in explaining the parallactic displacement caused by viewing an object with two fish-eye lenses. The fish-eye lenses 324 and 326 are placed such that points L and R are set as viewpoints, respectively. The points L and R are separated by a distance 2d. Lines 328 and 330 designate optical axes of the fish-eye lenses 324 and 326, respectively. The middle point between the points L and R is the point O. The depth of an object is defined as the distance of the object from the point O. The depth amount of the point A of the object equals to the length Z of the line segment OA. The angle made by the line segment OA with the perpendicular line 329 leading from the point O is represented by θ. The angle θ means the azimuth angle of the point A in case of viewing the point A from the point O.

The angle made by the line segment LA with the optical axis 328 of the fish-eye lens 324, i.e. the incident angle of the point A to the fish-eye lens 324, is represented by $\theta_1$, as well as the angle made by the line segment RA with the optical axis 330 of the fish-eye lens 326, i.e. the incident angle of the point A to the fish-eye lens 326, is represented by $\theta_2$. The angle $\theta_1$ means the azimuth of the point A in case of viewing the point A from the viewpoint L, and the angle $\theta_2$ means the azimuth of the point A in case of viewing the point A from the viewpoint R. Since the viewpoints are different from each other, the difference of $\theta_1-\theta_2$ comes out. This difference is called the parallactic angle. When the angle made between the line segments LA and RA is represented by $\theta_A$, because $\theta_A=\theta_1-\theta_2$, the angle $\theta_A$ may conventionally be regarded as the parallactic angle in case of viewing the point A from the different viewpoints L and R.

In case that the fish-eye lenses 324 and 326 are fθ lenses, because the image height r and the incident angle θ have the relationship: $r=f*\theta$, the difference between the image heights $r_L$, and $r_R$ and the difference between the incident angles $\theta_1$ and $\theta_2$ make a proportional relationship as follows:

$$r_L-r_R=f*(\theta_1-\theta_2).$$

Accordingly, in case of the parallactic images captured by the fish-eye lenses 324 and 326, if the difference between the image heights $r_L-r_R$ is determined, the difference between the incident angles $\theta_1$ and $\theta_2$ can be calculated to the extent that the focus length of the fish-eye lenses are known, and consequently the parallactic angle $\theta_A$ can be computed out.

Accordingly, a formula showing the relation between the parallactic angle $\theta_A$, the depth amount Z and the azimuth angle θ, will be obtained. The angle LAO is represented by $\theta_L$, and the angle RAO is represented by $\theta_R$. Considering triangles LAH and RAH, the following formulae are obtained:

$$\tan(\theta+\theta_L)=(Z*\sin\theta+d)/(Z*\cos\theta); \text{ and}$$

$$\tan(\theta-\theta_R)=(Z*\sin\theta-d)/(Z*\cos\theta).$$

Consequently, the parallactic angle $\theta_A$ is formulated as follows:

$$\theta_A=\theta_L+\theta_R=\tan^{-1}(Z*\sin\theta+d)/(Z*\cos\theta)-\tan^{-1}(Z*\sin\theta-d)/(Z*\cos\theta) \quad (1)$$

Figure 9:
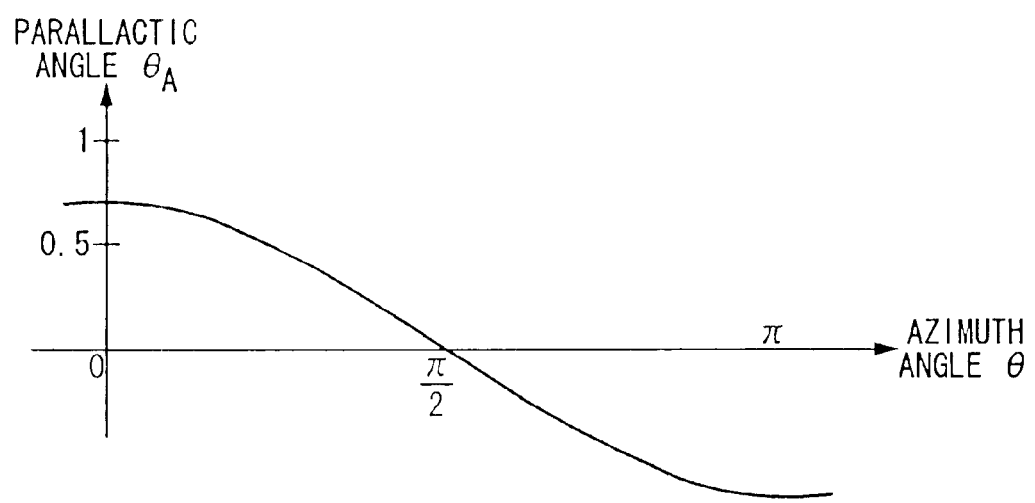
FIG. 9 is a graph showing the parallactic angle $\theta_A$ derived by the formula (1).

FIG. 9 is a diagram showing the parallactic angle $\theta_A$ by the formula (1). The diagram plots the parallactic angles $\theta_A$ for various azimuth angles θ while maintaining the distance 2d and the depth Z as constant values. When the azimuth angle θ equals to zero (θ=0), the parallactic angle $\theta_A$ gets the maximum value. When the azimuth angle θ equals to π/2 (θ=π/2), the parallactic angle $\theta_A$ become zero.

Figure 10:
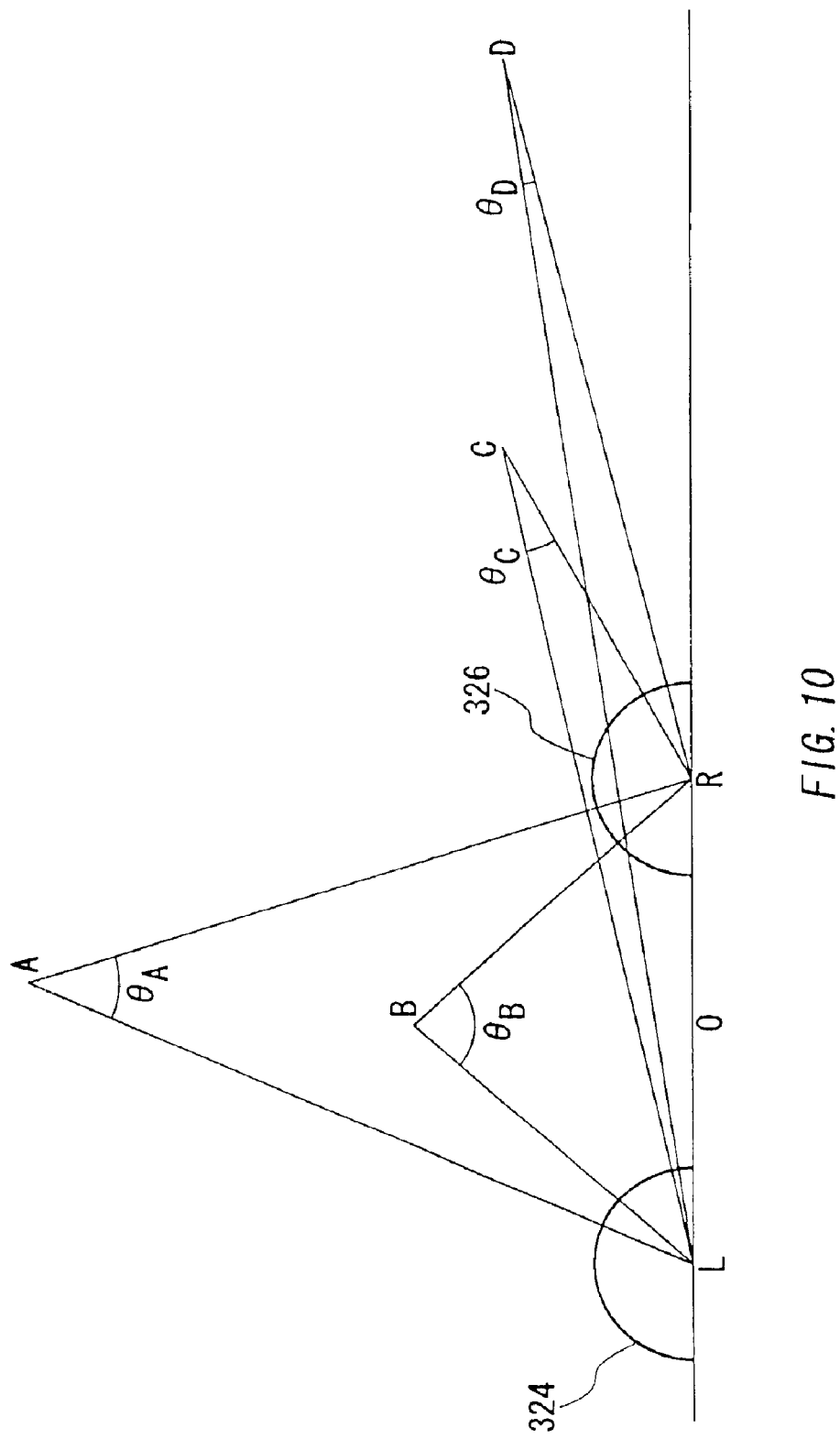
FIG. 10 shows the differences in the parallactic angles with respect to various points of the object.

As FIG. 9 shows, because the parallactic angle becomes very small for object regions near the direction or line along which the fish-eye lenses are arrayed, the displacements of the parallactic images therefore become extremely small. Reference is made to FIG. 10 in explaining the differences of the parallactic angle amounts of the object. As for points, such as A and B, of the object in regions in which the azimuth angle θ is near zero, the parallactic angles $\theta_A$ and $\theta_B$ are sufficiently large so that it is easy to detect the displacement of the parallactic images. Since the parallactic angle of the point B is larger than that of the point A as apparent from FIG. 10, the displacement at the point B is larger than that at the point A. This means the nearer the object is to the point O, the larger the displacement of the parallactic images. About points, such as C and D, of the object in regions in which the azimuth angle θ is near π/2, the parallactic angles $θ_C$ and $θ_D$ are small, and it is difficult to detect the displacements of the parallactic images. The parallactic angle of the point D is smaller than that of the point C, meaning the more distant the object from the point O, the smaller the displacement of the parallactic images.

Figure 11:
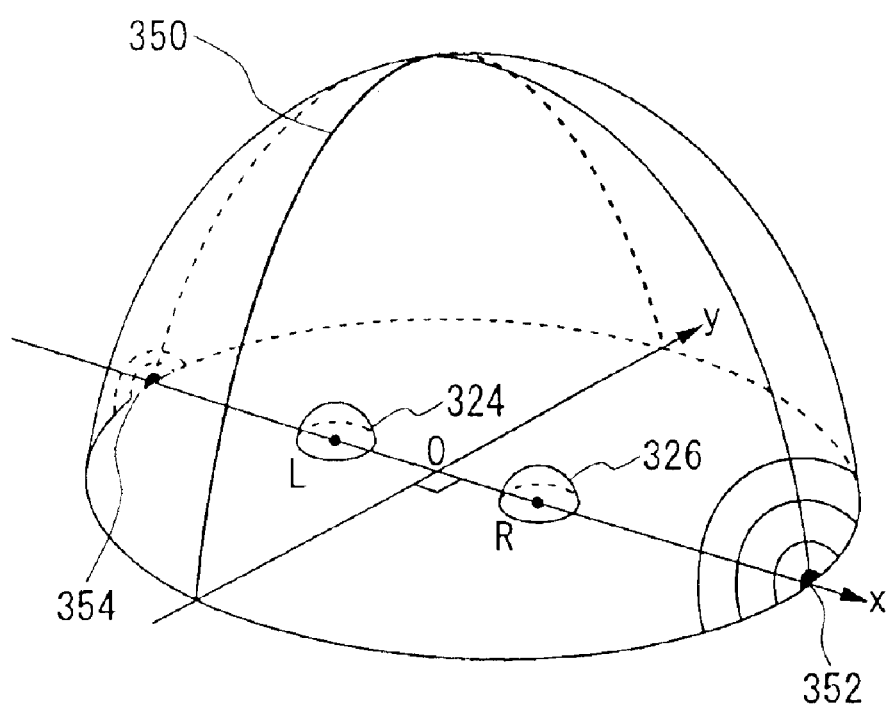
FIG. 11 shows the difference of the displacements shown on the celestial sphere.

Reference is made to FIG. 11 in explaining the differences of the displacements shown on the celestial sphere. The celestial sphere represents the infinite distance of the visual field, but only the upper semi-sphere is shown in this figure. The middle point of the line segment drawn between the viewpoints L and R of the fish-eye lenses 324 and 326 is the center O of the celestial sphere. The plane which includes the center O and is perpendicular to the line LR is represented by the semicircle 350. Furthermore, the points at which the line drawn between the viewpoints L and R crosses with the celestial sphere are represented by the points 352 and 354.

In this celestial sphere, the azimuth angle θ in case of viewing a point of an object from the center O is an angle formed by a line drawn between a point of the object and the center O with the semicircle 350. The largest displacement comes out for regions in which the azimuth angle θ becomes zero (θ=0). These regions coincide with the semicircle 350.

On the other hand, the displacement completely disappears for regions in which the azimuth angle θ becomes the right angle (θ=π/2). These regions coincide with points on the line segment between the point 352 and the viewing point R, or the line segment between the point 354 and the viewpoint L.

The displacement amount appears symmetrically around the line drawn between the viewing points L and R, i.e. the x-axis. Considering a cross section of the celestial sphere cut by a plane parallel to the semicircle 350, the cross section forms a semicircular shape, and any points on the peripheral line of the semicircle have the same displacement amount. Accordingly, we may sufficiently discuss the displacement amounts on cross sections of the celestial sphere cut by any planes including the x-axis. As an example of the planes including the x-axis, the x-y plane, which is the horizontal plane of the celestial sphere, will be considered.

Figure 12:
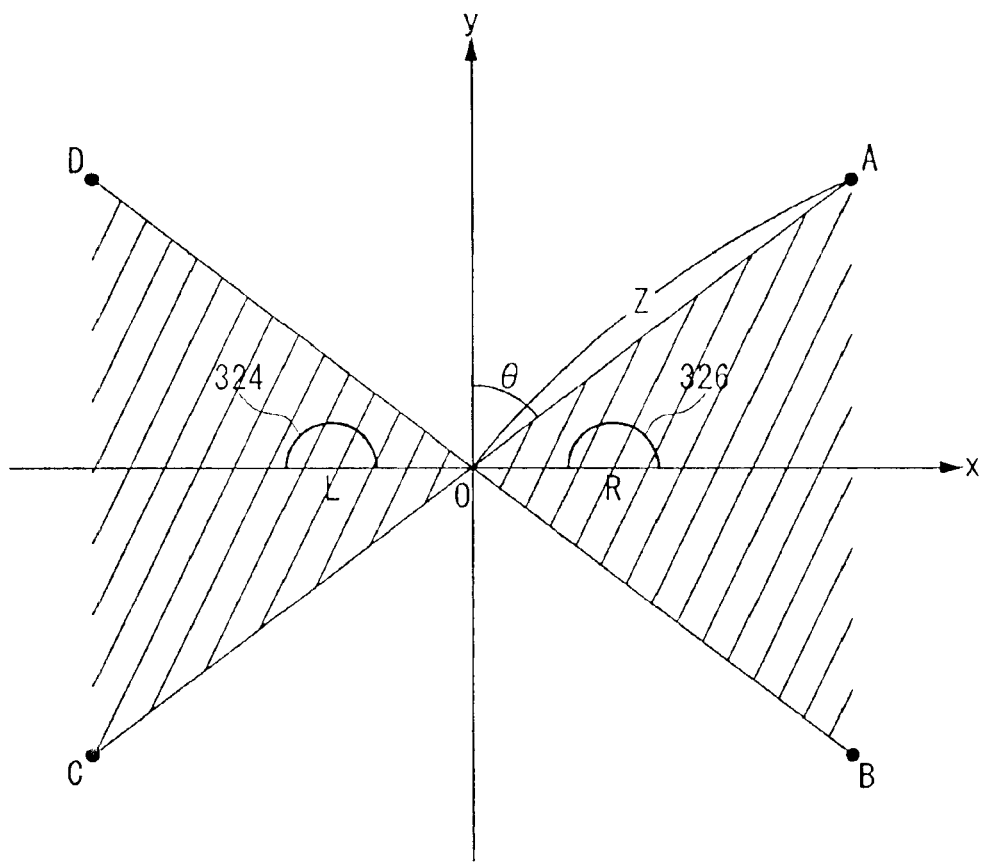
FIG. 12 shows the difference of the displacement amounts shown on the horizontal plane of the celestial sphere.

Reference is made to FIG. 12 in explaining the differences of the displacement amounts shown on the horizontal plane of the celestial sphere. Assuming that the point A is oriented by the azimuth angle θ, a cone which is formed by the rotation of the triangle OAB around the x-axis will be considered. As described above, if a particular azimuth angle θ is determined, a cone in which the apex is the center O and the conical angle is π/2, is thereby defined.

In case that the azimuth angle θ is near π/2, points within the cone are located in regions near the x-axis. As for these points within the cone, the displacement almost vanishes. On the other hand, in case that the azimuth angle θ is near zero (0), the conical angle becomes almost π/2, and therefore the cone involves all points near the y-axis. With respect to points outside the cone and near the y-axis, the displacement is strong.

Figure 13:
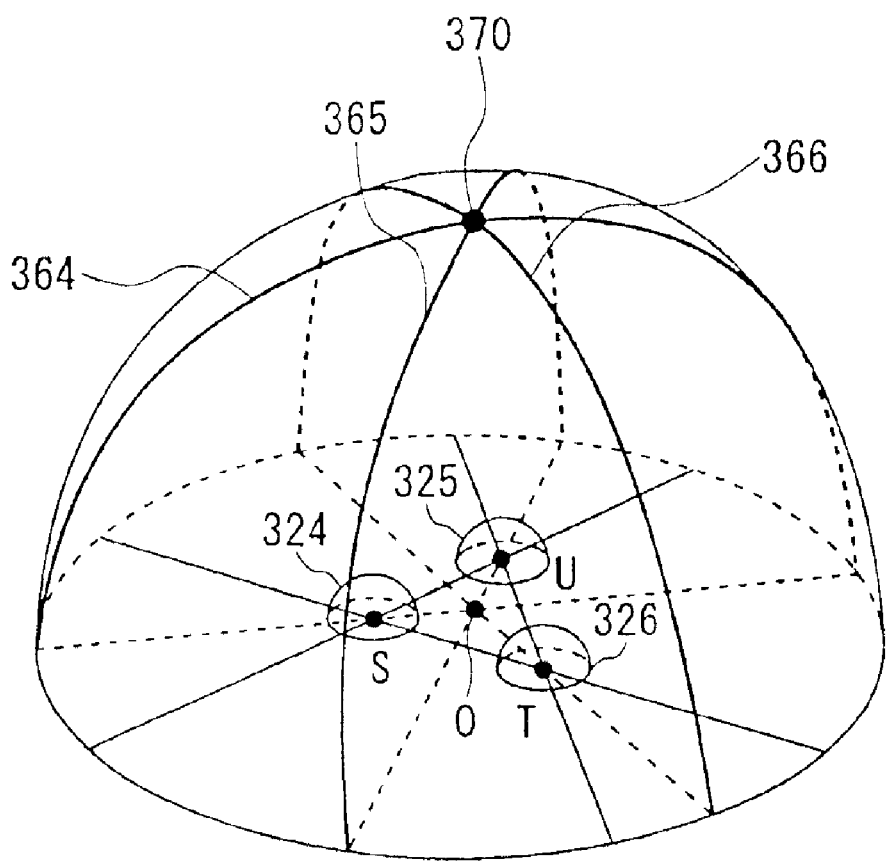
FIG. 13 shows the relationship of the displacements among the three viewpoints, shown on the celestial sphere.

As described above, the regions having a small displacement of the parallactic images exist in the direction of arraying the fish-eye lenses. These regions are called the "dead angle" regions. In the dead angle regions, it is difficult to get the depth amount of the object based on the displacement amount. Accordingly, even if fish-eye lenses having the wide visual angle are used, it is impossible to obtain the depth amount of the object through the whole azimuth angle by use of two parallactic images, and the dead angle region in which the depth amount is hard to get appears in the direction of the arraying of the two viewpoints. Therefore, the present invention achieves calculation of the depth amount for the dead angle region by use of three or more parallactic images which are captured from three or more different viewpoints which are not in the same straight line. Reference is made to FIG. 13 in explaining the relationship of the displacements among the three viewpoints, shown on the celestial sphere. The fish-eye lenses 324, 325 and 326 are located at apexes of a regular triangle, and these viewpoints are represented by S, U and T, respectively. The gravity center of the regular triangle STU coincides with the center O of the celestial sphere. The plane including the center O and perpendicular to the line ST defines the semicircle 365. Similarly, the plane including the center 0 and perpendicular to the line TU defines the semicircle 364, as well as the plane including the center O and perpendicular to the line US defines the semicircle 366. The peripherals of these semicircles 364, 365 and 366 cross at the point 370 of the celestial sphere.

The largest displacement comes out on the semicircle 365, in case of viewing from the viewpoints S and T. In case of viewing from the viewpoints T and U, the largest displacement appears on the semicircle 364. In case of viewing from the viewpoints U and S, the largest displacement appears on the semicircle 366. Accordingly, it is possible to calculate the depth amounts for the regions besides the three semicircles 364, 365 and 366, by use of the displacement that is viewed from two of the three viewpoints S, T and U. Even if a region of the object falls under the dead angle region viewed from a particular pair of the viewpoints, the same region comes under a region having a large displacement in case of viewing it from another pair of the viewpoints, so that the dead angle region can be eliminated. Moreover, at the point 370, at which the peripherals of the three semicircles 364, 365 and 366 cross, the depth amount is obtainable by use of three displacement amounts, and it provides the highest accuracy.

Figure 14:
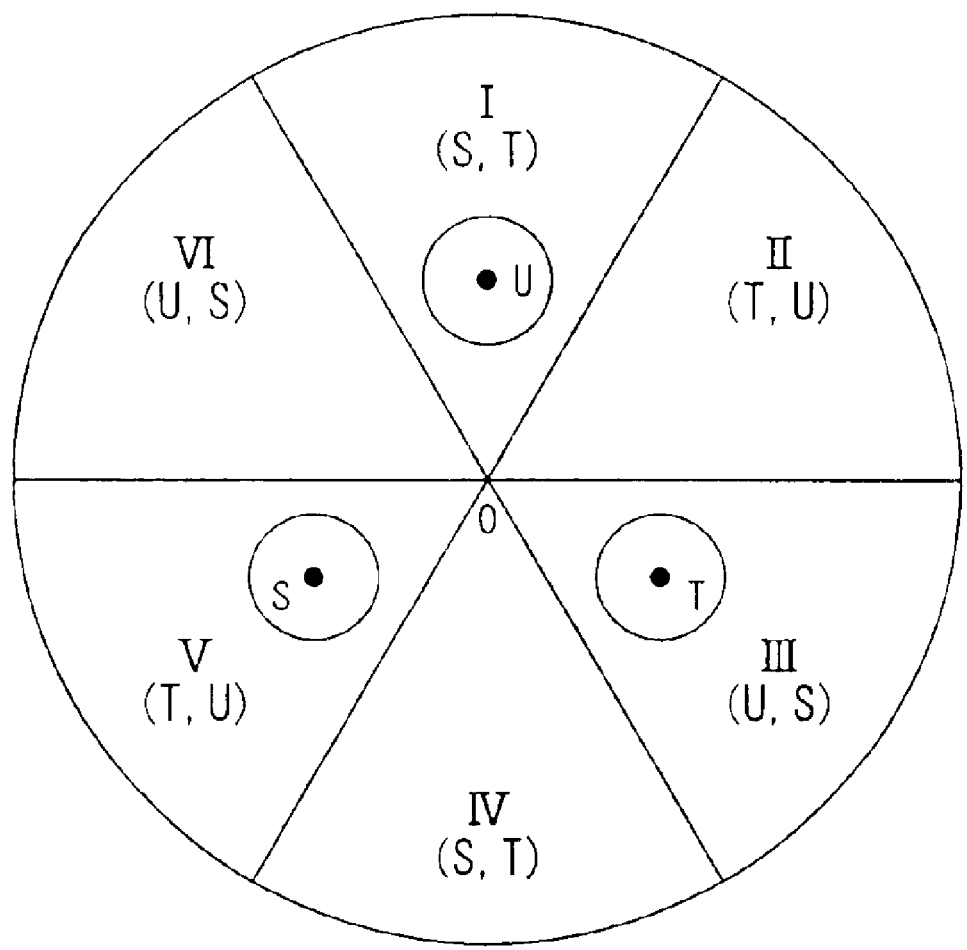
FIG. 14 shows the relationship among the three displacements, shown on the horizontal plane of the celestial sphere.

Reference is made to FIG. 14 in explaining the relationship among the three displacements, shown on the horizontal plane of the celestial sphere. As for regions of the object in the directions of the regions I and IV, the displacement is the greatest when viewing from the viewpoints S and T. Similarly, as for regions of the object in the directions of the regions II and V, the displacement of the viewpoints T and U is the greatest. Furthermore, as for regions of the object in the directions of the regions III and VI, the displacement of the viewpoints U and S is the greatest.

As described above, even in the dead angle region in which a depth value is difficult to calculate based on a pair of parallactic images viewed from two viewpoints, the combination of another parallactic image viewed from the third viewpoint eliminates the dead angle and it is possible to calculate the depth amount of the object through the whole azimuth angle.

Using combinations of any two out of three or more parallactic images, plural displacements are detected at a specific region. The method for calculating the depth amount of a specific region based on the combination of the plural displacements may be modified in various ways. Explained first is a method in which a combination of viewpoints, which bring the largest displacement for the azimuth of a specific region of the object, is selected and, based on the displacement detected by the combination of the viewpoints, the depth amount of the specific region is calculated.

Figure 15:
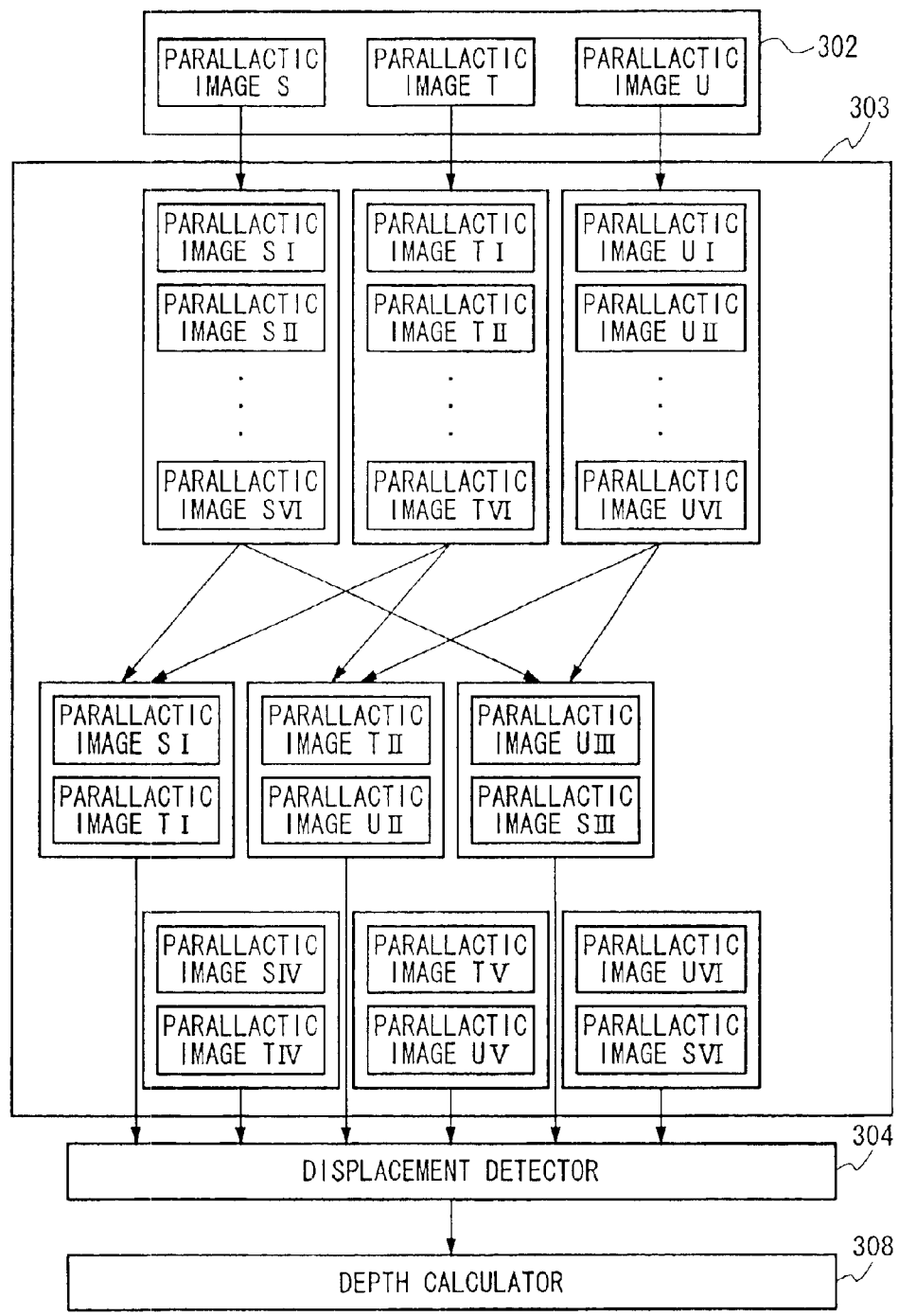
FIG. 15 shows schematically the functions of the parallactic image region selector 303.

In addition to the function blocks shown in FIG. 6, the processing unit 60 provides a parallactic image region selector 303 as a further function block. Reference is made to FIG. 15 in describing the function of the parallactic image region selector 303. The parallactic image storing section 302 stores the three parallactic images S, T and U viewed respectively from the three viewpoints S, T and U as shown in FIGS. 13 and 14, for instance. The parallactic image selector 303 divides the parallactic images stored in the storing section 302 into regions I, II, III, IV, V and VI. For each of the regions I, II, III, IV, V and VI, a combination of the parallactic images is selected such that these parallactic images give the largest displacement in the region. For example, the combination of the parallactic images SI and TI is selected for the region I, and the combination of the parallactic images TII and UII is selected for the region II. The displacement detector 304 detects, based on the combination thus selected for each of the regions I, II, III, IV, V and VI, the displacement amount of the object in the region. Based on the respective displacement amounts thus detected for the regions I, II, III, IV, V and VI, the depth calculator 308 establishes a distribution of the depth amounts of the object for the corresponding region.

In contrast to selecting the combination of viewpoints for detecting the displacement depending on the azimuth of a specific region of the object, as shown in FIG. 15, the depth amount of the specific region may be calculated such that the plural displacement amounts detected by the combinations of any pairs of viewpoints are taken into consideration. In this case, the depth amount may be obtained by determining the ratios of how much each of the displacement amounts detected by the respective combinations of the viewpoints are taken into consideration, and the displacement amounts are then considered depending on the ratios. More specifically, the depth amount of a specific region of the object may be calculated by taking the weighted mean from the depth amounts computed from the plural displacement amounts.

Figure 16:
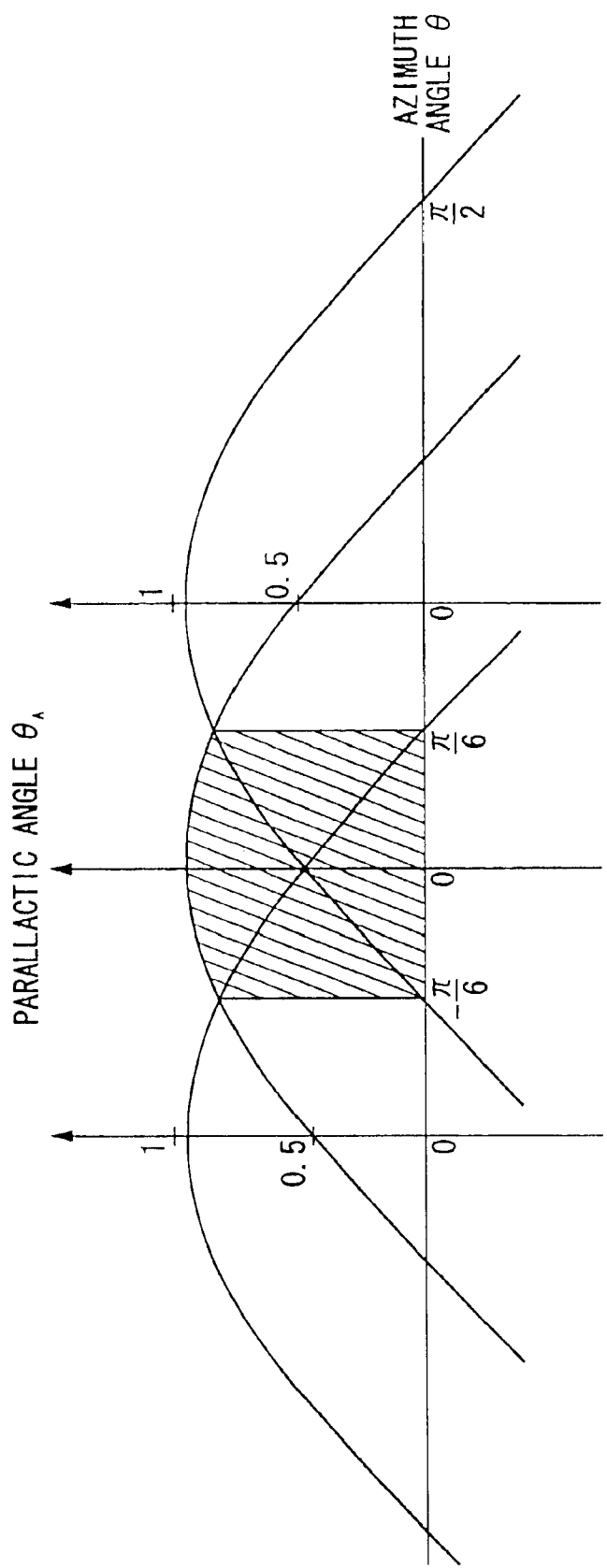
FIG. 16 shows the variation of the three parallactic angles from the respective three viewpoints.

For instance, in case of the combination of a particular pair of viewpoints, in which the absolute value of the azimuth angle $\theta$ of a specific region is smaller than $\pi/6$, the displacement viewed from the particular pair of viewpoints is considered with the largest ratio, but displacements viewed from other pairs of the viewpoints are considered with relatively smaller ratio(s). FIG. 16 is a diagram showing variation of the three parallactic angles from the respective three viewpoints. The three diagrams of the parallactic angles shown in FIG. 9 are combined into one with changing phases. Within a range in which the absolute value of the azimuth angle $\theta$ of a specific region is smaller than $\pi/6$, one of the parallactic angles is greater than the other two and makes the accuracy of detection high. Accordingly, the depth amount calculated from the highest accuracy displacement is given a largest weighted ratio, but the depth amounts calculated from the other two disolacements are given smaller weighted ratios, then the weighted mean is computed from the three depth amounts, and the final depth amount of the specific region of the object is established.

Moreover, when the depth amount of a specific region of the object that is to be imaged based on parallactic images is to be determined, all displacements of all pairs from the three or more parallactic images are measured, and the depth amount may be calculated by use of the displacement which has the highest detection accuracy of the plural displacements. Especially, when an object which has overlapped portions is image-formed, the combination of the parallactic images that provide the highest detection accuracy of the displacement possibly depends not only on the azimuth but also on the depth distribution. Therefore, it is more preferable that the combination is not selected based only on the azimuth of the specific region of the object, but the displacement amount of the combination of a particular pair of parallactic images to be used is determined also for each of the specific regions, or the ratios of plural displacements from any pairs of the parallactic images are determined for each of the specific regions.

By specifically analyzing the parallactic angle formula (1), it is found out that regions having a certain amount of accuracy for detecting the displacement amount are not established only by the azimuth angle but also depend on the depth amount of the object. Accordingly, more specifically, even if azimuths of the object are the same, when distances to the object are different from each other, the degrees of accuracy for detecting the respective displacement amounts are different. In this case, it is necessary to chance the ratios for consideration of the plural displacements of any pairs of the parallactic images, depending on the depth amount of the specific region under consideration. When the depth amount of a specific region is imaged on parallactic images, plural displacements of any pairs from the parallactic images are detected, and a temporary depth value is estimated by preferentially using a displacement amount having the highest detection accuracy. Subsequently, and more advantageously, based on the azimuth of the specific region and the temporary depth amount, ratios for consideration of the plural displacements of any two parallactic images are determined, and the final depth amount is calculated.

As described above, the method for calculating the depth amount of the object based on the plural displacements of any two parallactic images can be modified in various ways. In any event, to combine plural displacements so as to get an advantageous detection accuracy, and to find out the depth amount of the specific region of the object, are characteristic features of the present invention. However, there is a considerable degree of freedom in combining the plural displacements and calculating them.

Figure 17:
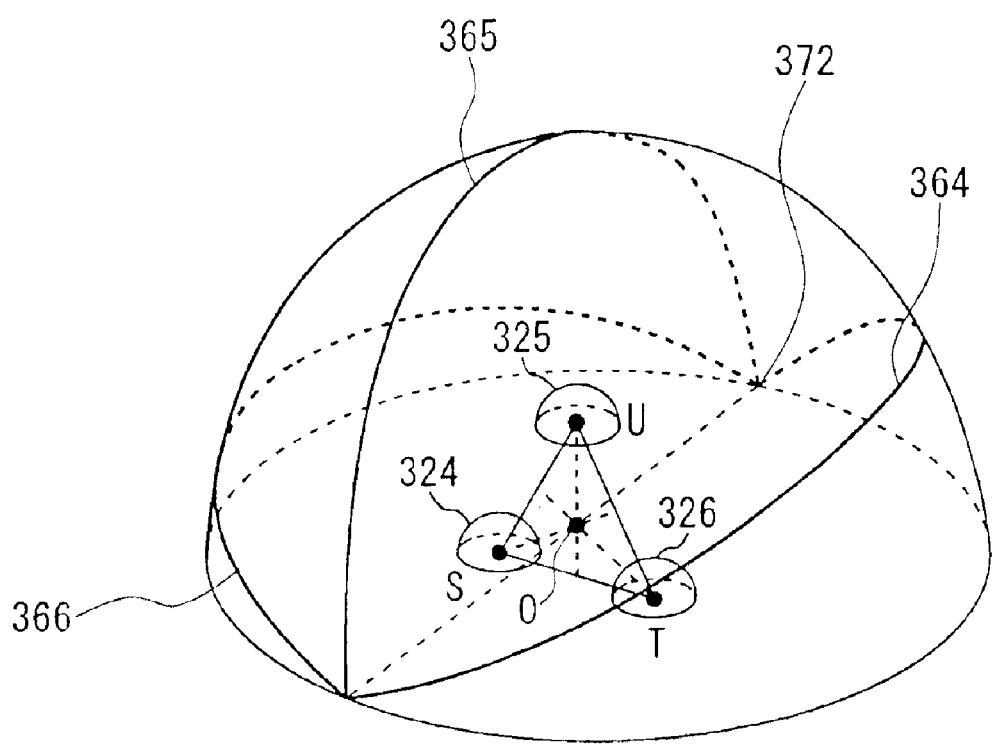
FIG. 17 shows another relationship of the displacements among the three viewpoints, shown on the celestial sphere.

Furthermore, there is a degree of flexibility in arrangement of the three fish-eye lenses as well. In FIG. 13, the three fish-eye lenses are located at the apexes of the regular triangle on the horizontal plane of the celestial sphere, and the optical axes of all the fish-eye lenses are perpendicular to the regular triangle. However, the arrangement of the fish-eye lenses is not limited to this arrangement. Reference is made to FIG. 17 in explaining the relationship of the displacements among the three viewpoints, shown on the celestial sphere. The fish-eye lenses 324, 325 and 326 are positioned at apexes of a regular triangle that is perpendicular to the horizontal plane of the celestial sphere, and the center of gravity of the regular triangle coincides with the center O. Viewpoints of the fish-eye lenses 324, 325 and 326 are points S, U and T, respectively, and the optical axes of all the fish-eye lenses run within a plane defined by the regular triangle STU. A plane which includes the center O and is perpendicular to the line ST is represented by the semicircle 365. Similarly, a plane including the center O and perpendicular to the line TU is represented by the semicircle 364, and a plane including the center O and perpendicular to the line US is represented by the semicircle 366. The peripherals of these semicircles 364, 365 and 366 cross one another at a point 372 on the horizontal plane of the celestial sphere.

The largest displacement comes out on the semicircle 365 when viewing from the viewpoints S and T. In case of viewing from the viewpoints T and U, the largest displacement appears on the semicircle 364. In case of viewing from the viewpoints U and S, the largest displacement appears on the semicircle 366. Accordingly, it is possible to calculate the depth amounts for the regions beside the three semicircles 364, 365 and 366, by use of the displacement that is viewed from two of the three viewpoints S, T and U. Moreover, at the point 372, at which the peripherals of the three semicircles 364, 365 and 366 cross, the depth amount is obtainable by use of three displacement amounts, and this provides the highest accuracy. As described above, there is flexibility in the arrangement positions of the fish-eye lenses. In order to eliminate the dead angle, it is preferable if the three viewpoints are not arrayed in the same line, and more preferably, if the triangle defined by the three viewpoints defines a regular triangle.

Figure 18:
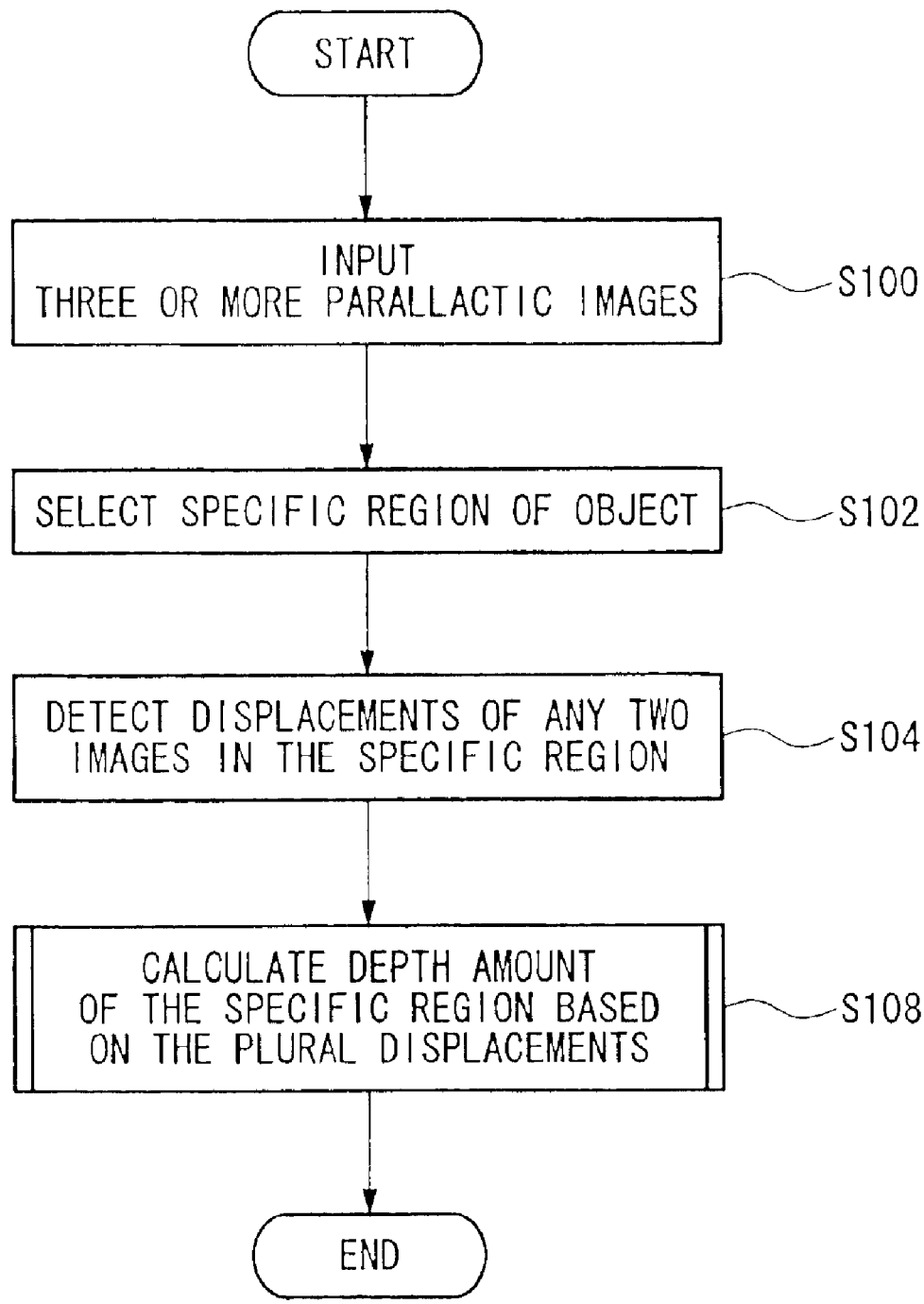
FIG. 18 is a flowchart of a process which calculates the w depth amount of the object.

FIG. 18 is a flowchart showing a process for calculating the depth amount of the object. Three or more parallactic images of an object, captured by the image capturing unit 20, from three or more different viewpoints are inputted (S100). A specific region is selected from the object image that is formed based on the parallactic image (S102). The selection of the specific region may be achieved such that the parallactic image is divided into suitable regions, and the regions thus divided are automatically selected in order, or regions manually designated by the user by use of the operative unit 110 may be selected. The displacement detector 304 detects plural displacements between any two of the parallactic images with respect to the specific region of the object (S104). The depth calculator 308 calculates the depth amount of the specific region, based on the plural displacement amounts of the images of the specific region (S108).

Figure 19:
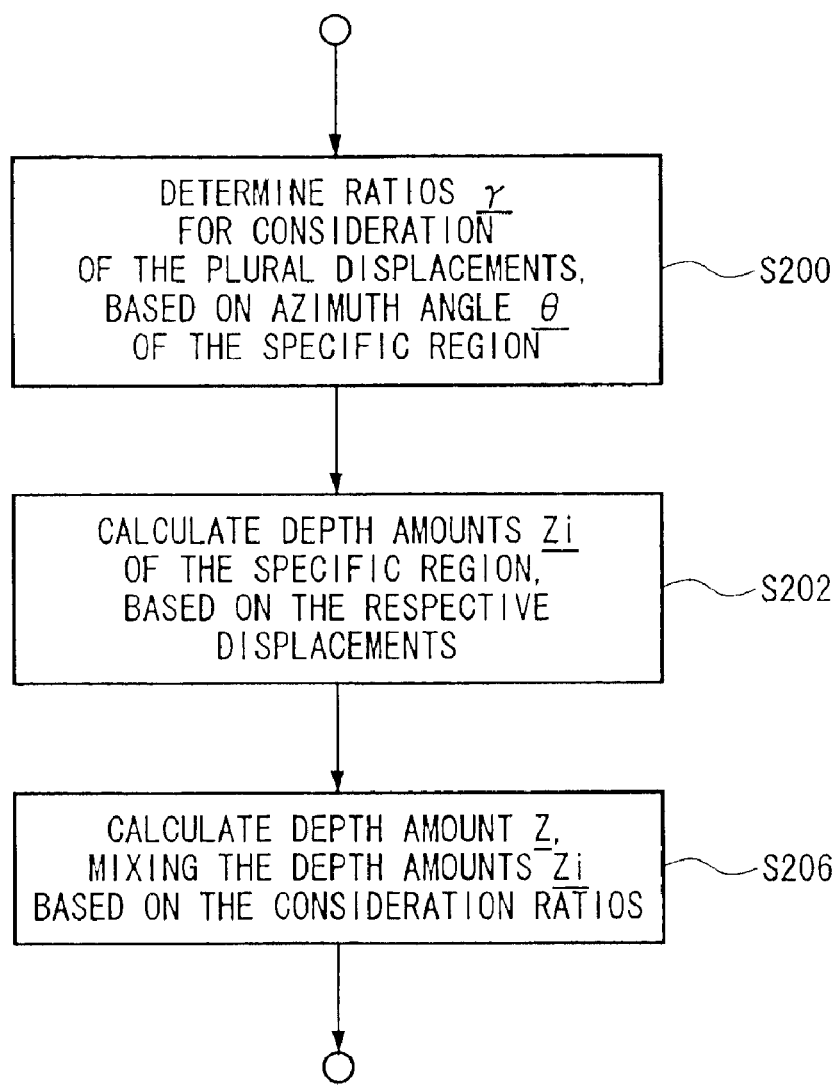
FIG. 19 is a flowchart of a depth amount processing step S108.
Figure 20:
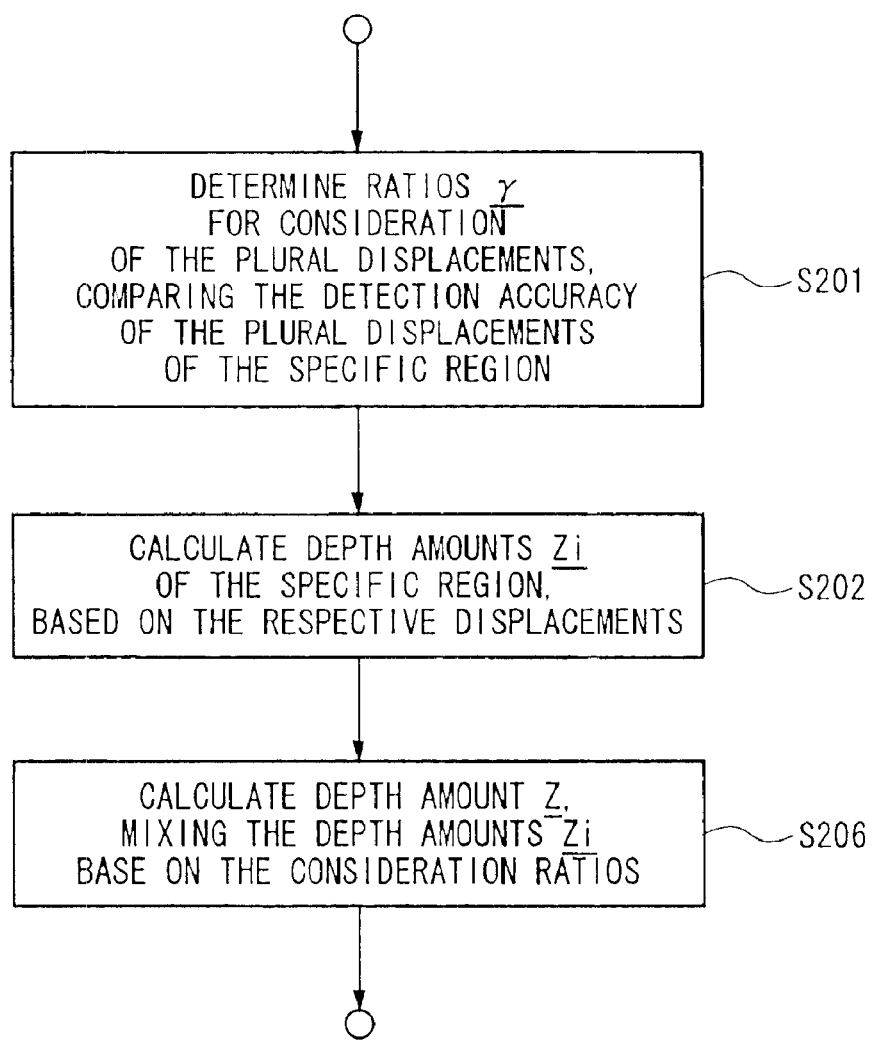
FIG. 20 is a flowchart of a modified depth amount processing step S108.

FIG. 19 is a flowchart showing the depth amount processing step S108. Weighting ratios $\gamma$ for consideration of the plural displacement amounts are determined, based on the azimuth angle $\theta$ of the specific region of the object (S200). When the azimuth angle $\theta$ is near zero (0), in case of viewing from the middle point of a particular pair of the viewpoints, a large ratio for consideration is given to the displacement between the respective two parallactic images viewed from the particular pair of viewpoints, but smaller ratios for consideration are given to the other displacements of the other pairs of the parallactic images. Subsequently, each of the depth amounts Zi (i=1, 2, ... ) of the specific region is calculated by use of the formula (1), based on the corresponding one of the displacement amounts from the respective pairs of the parallactic images (S202). By applying the depth amounts Zi (i=1, 2, ... ) based on the consideration ratios of the plural displacements, the depth amount Z is calculated (S206). A method for applying the depth amounts Zi (i=1, 2, ... ) to obtain the depth amount Z is to determine the weighted mean of Zi (i=1, 2, ... ) with the respective ratios y thereby getting Z, for instance.

The depth amount processing step S108 may be modified in several ways is a flowchart showing a modified depth amount processing step S108. For each specific region of the object, the degrees of accuracy for detection of the plural displacements of any pairs of the parallactic images are compared with one another, and the ratios y for consideration of the plural displacement are determined (S201). The following steps S202 and S206 are the same as described in connection with FIG. 19. In this modification, the ratios y are not determined depending on the azimuth angle $\theta$ of the specific region of the object, but are determined by giving greater consideration to the displacement having the better accuracy out of the plural displacements of any pairs of the parallactic images in the specific region.

Figure 21:
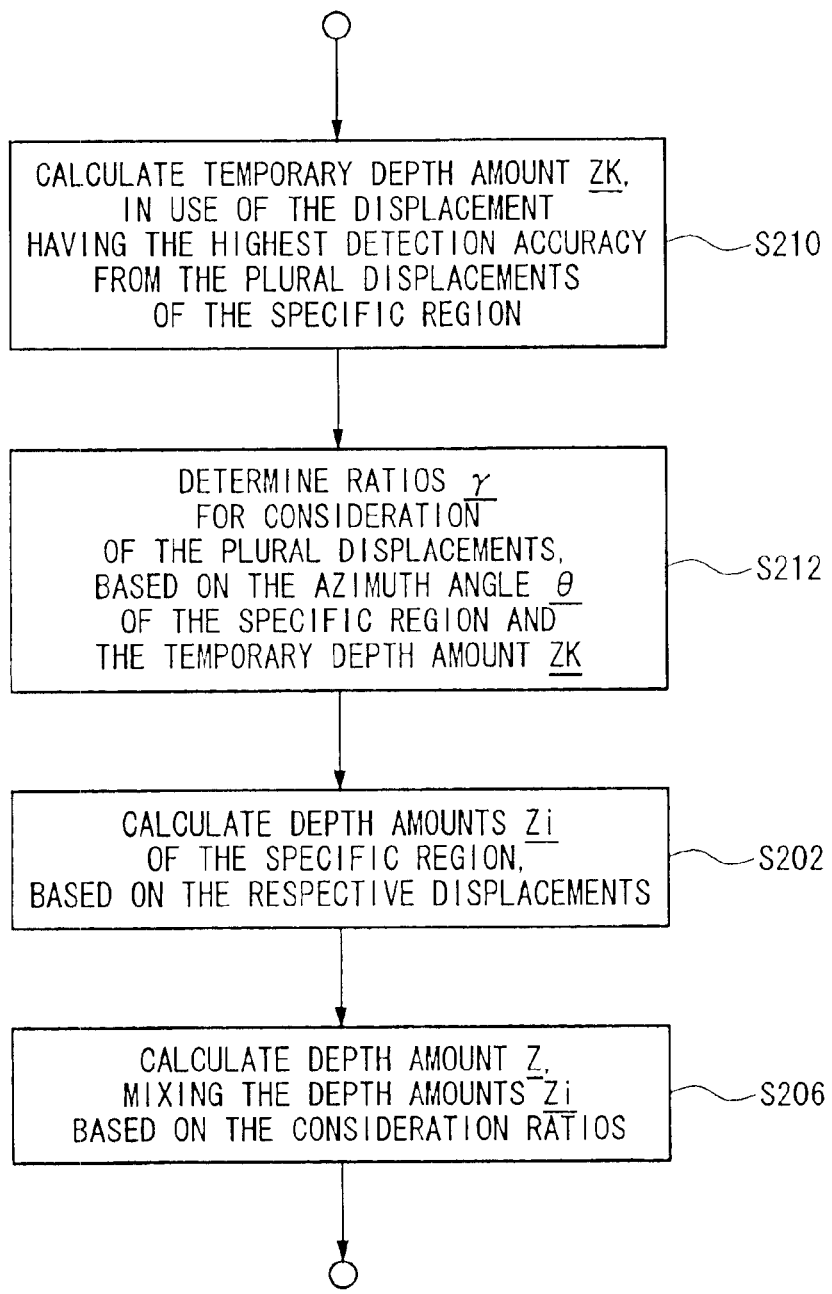
FIG. 21 is a flowchart of yet another modified depth amount processing step S108.

FIG. 21 is a flowchart showing yet another modified depth amount processing step S108. For each specific region of the object, the degrees of accuracy for detection of the plural displacements of any pairs of the parallactic images are compared with one another, and a temporary depth amount ZK is estimated by use of the displacement amount having the highest detection accuracy (S210). Based on the azimuth angle $\theta$ of the specific region and the temporary depth amount ZK, the ratios $\gamma$ for consideration of the plural displacement are determined (S212). The following steps S202 and S206 are the same as described in connection with FIG. 19. This embodiment is different from the others in determining the ratios $\gamma$ by use of the azimuth angle $\theta$ of a specific region and the temporary depth amount ZK thereof.

Figure 22:
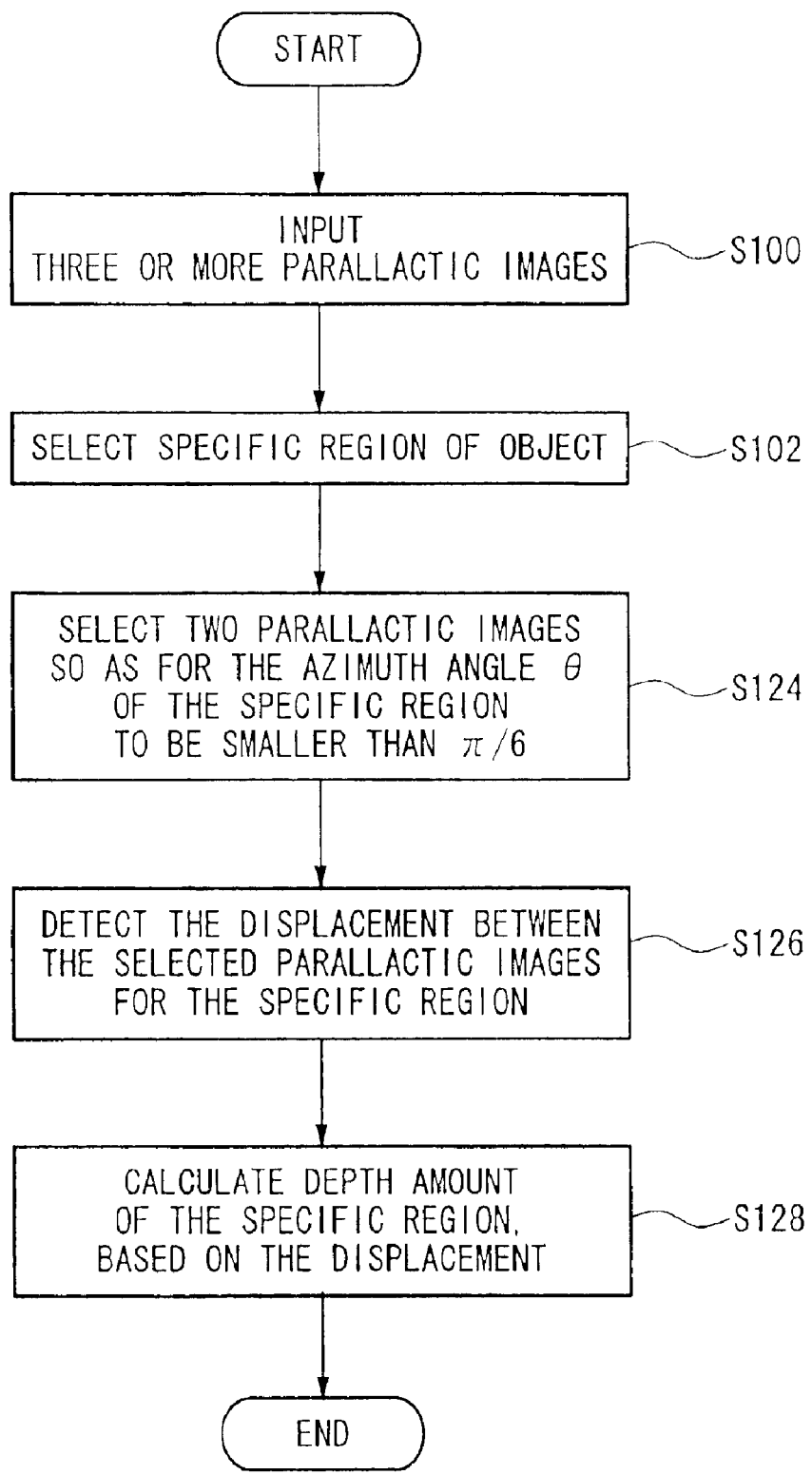
FIG. 22 is a flowchart of another process which calculates the depth amount of the object.

FIG. 22 is a flowchart showing another process which calculates the depth amount of the object. Three or more parallactic images of an object that are captured by the image capturing unit 20 from three or more different viewpoints are inputted (S100). A specific region is selected from the object image formed based on the parallactic image (S102). The selection of the specific region may be achieved such that the parallactic image is divided into suitable regions, and the regions thus divided are automatically selected in order, or the regions manually designated by the user by use of the operative unit 110 may be selected. The displacement detector 304 selects a particular pair of the parallactic images so that the azimuth angle $\theta$ of the specific region is smaller than $\pi/6$ (S124), and detects the displacement between the selected pair of the parallactic images with respect to the specific region of the object (S126). The depth calculator 308 calculates the depth amount of the specific region, based on the displacement between the selected pair of images of the specific region (S128).

The accuracy for detecting the displacement and the processing cost depends on the performance of hardware, such as the resolution of the CCD 30 of the lens section 20 and the processing performance of the main CPU 60, the nonvolatile memory 66, the main memory 68, or the main bus 82 of the processing unit 60 which carries out the image process, as well as on the functional structures of the system, such as the performance of the image processing algorithm for extracting the specific regions from the images and detecting the displacements. Accordingly, the ratios taken into consideration with the plural displacements of any two parallactic images are not always decided just from the detection accuracy, which theoretically, is obtained from the formula (1).

As described above, the method for finding the depth amount of the object by use of the plural displacement amounts may be achieved in various ways, depending on the azimuth angle of the specific region of the object, the presumed depth amount of the object, the accuracy in detecting the displacements or the processing cost, the hardware performances, or the functional structures of the system, In any event, according to the image capturing apparatus of the present embodiment, the depth information of the object through the whole azimuth angle can be calculated with a high degree of accuracy as well as a high efficiency, because, even if one or some of the plural displacements have a low detection accuracy depending on the azimuth of the region of the object, or if one or some azimuth angles have a high processing cost of detecting their displacements, the use of other displacement amounts can complement the result thereof.

As described above, the image capturing apparatus of the present invention can capture three or more parallactic images of an object viewed from three or more viewpoints with lens(es) having a wide visual angle, detect plural displacement amounts of the images of the object, and find the depth amount of the object based on the plural displacement amounts. Even if the detection accuracy is low based only on the displacement amount between the parallactic images viewed from two of the viewpoints with respect to the azimuth of a particular region of the object, the combination of the parallactic image viewed from the third viewpoint can improve the detection accuracy of the displacement, and consequently the depth information of the object can be calculated through the wide visual field with a high degree of accuracy as well as high efficiency.

Furthermore, the image capturing apparatus according to the present embodiment may be used with a monitoring camera. Conventional monitoring cameras have to be rotated or otherwise driven so that the camera moves to obtain the whole azimuth image. If the image capturing apparatus of the present embodiment is used as a monitoring camera, it can capture the object through the whole azimuth and calculate the depth information without it becoming necessary to move the camera itself. Because it is easy to extract main objects, such as persons, from the depth information thus obtained, such monitoring cameras can be installed in banks and retailer shops for helping the prevention of crime.

Second Embodiment

Figure 23:
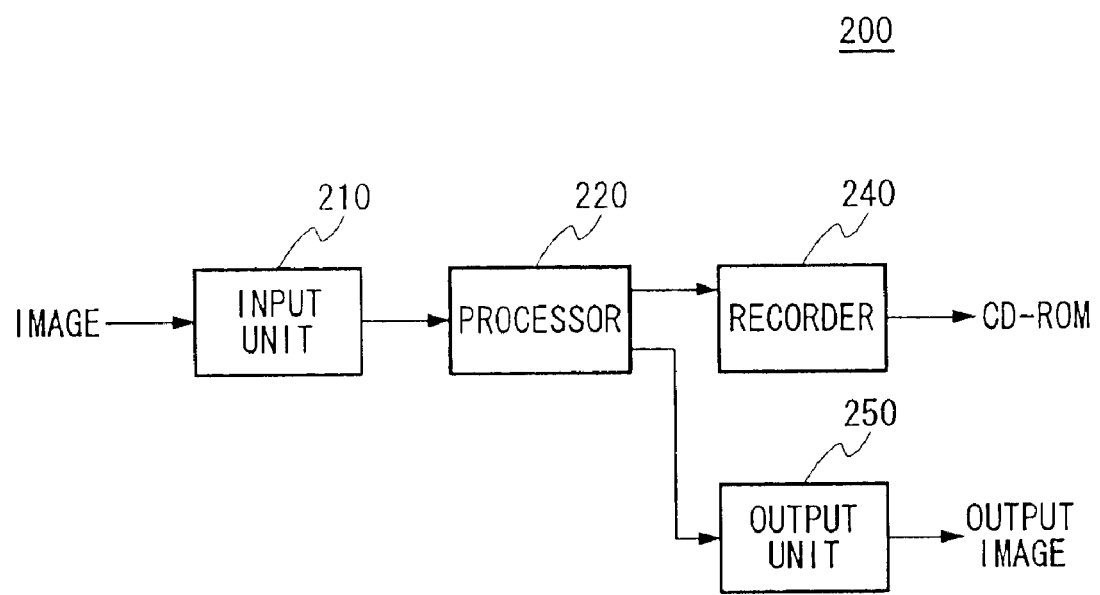
FIG. 23 shows schematically a laboratory system 200 as an example of an image processing apparatus which develops and edits photo images.

A second embodiment of the present invention will be explained with reference to FIG. 23 which shows a laboratory system 200, as an example of an image processing apparatus which develops and edits photo images. The laboratory system 200 of the present embodiment has an input unit 210, a processor 220, a recorder 240 and an output unit 250.

The input unit 210 carries out input of image data of an object. The parallactic images of the object in case of viewing from different viewpoints are inputted as the image data. If digital images of the object captured by a digital camera or the like are inputted, a reader is used for reading cut the image data from a detachable recording medium such as a semiconductor memory card. Besides, a floppy drive, an MO drive, a CD drive or the like may be available to the input unit 20 if the image data is read out from a floppy disk, an MO, a CD-ROM or the like, respectively.

The processor 220 stores the parallactic images inputted by the input unit 210, and calculates the depth information of the object. The processor 220 outputs the depth information thus calculated along with the parallactic images to the recorder 240. Furthermore, the processor 220 may subject the images of the object to some processing based on the depth information thus calculated, and output to the recorder 240 and the output unit 250.

The recorder 240 records the depth information or the image data outputted by the processor 220 on a detachable recording medium. An optical recording medium, such as a rewritable CD-ROM or DVD, a magnetooptical recording medium such as a MO, or a magnetic recording medium such as a floppy disk, is available as the recording medium. A CD-R drive, a DVD drive, an MO drive, or a floppy drive serves as the recorder 240. Furthermore, the recorder 240 records the depth information or the image data on a FLASH memory or a semiconductor memory such as a memory card.

The output unit 250 outputs, as an image, the image data which are subjected to the processing and outputted by the processor 220. For instance, if the image is displayed on the screen, a monitor which displays the image serves as the output unit 250. Besides, if the image is printed out, a printer such as a digital printer or a laser printer is available to the output unit 250.

Figure 24:
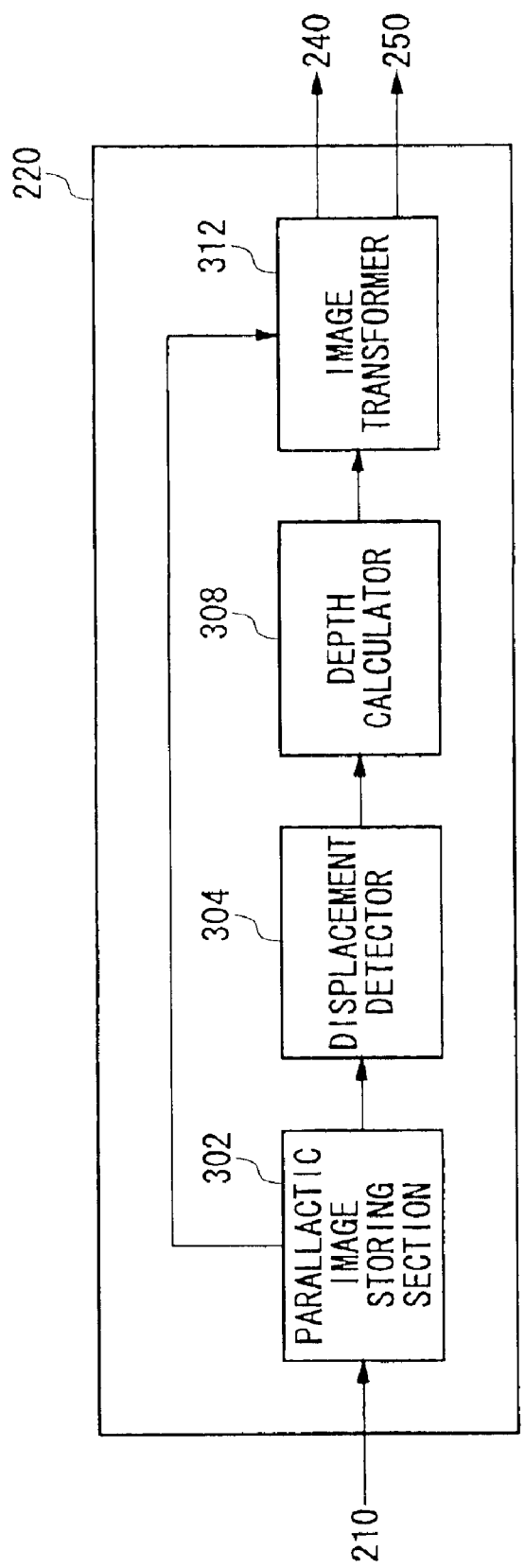
FIG. 24 shows schematically the processor 220.

FIG. 24 is a functional structure diagram of the processor 220. The processor 220 includes a parallactic image storing section 302, a displacement detector 304, a depth calculator 308 and an image transformer 312.

The parallactic image storing section 302 stores the data of three or more parallactic images inputted by the input unit 210 in a semiconductor memory such as a RAM or a magnetic recording medium such as a hard disk. The displacement detector 304 detects the displacement amounts, because of the parallax, of the position of a specific region of the object with respect to any pairs of the three or more parallactic images stored by the parallactic image storing section 302.

The processes for calculating the depth information of the object through the whole region, or a part thereof, based on the parallactic images, by the displacement detector 304 and the depth calculator 308 are similar to that of the first embodiment, and therefore a detailed explanation is not given here.

The image transformer 312 processes the images of the object, based on the depth information of the object calculated by the depth calculator 308. The image transformer 312 outputs the depth information of the object, the parallactic images, or the processed image to the recorder 240 and the output unit 250.

Figure 25:
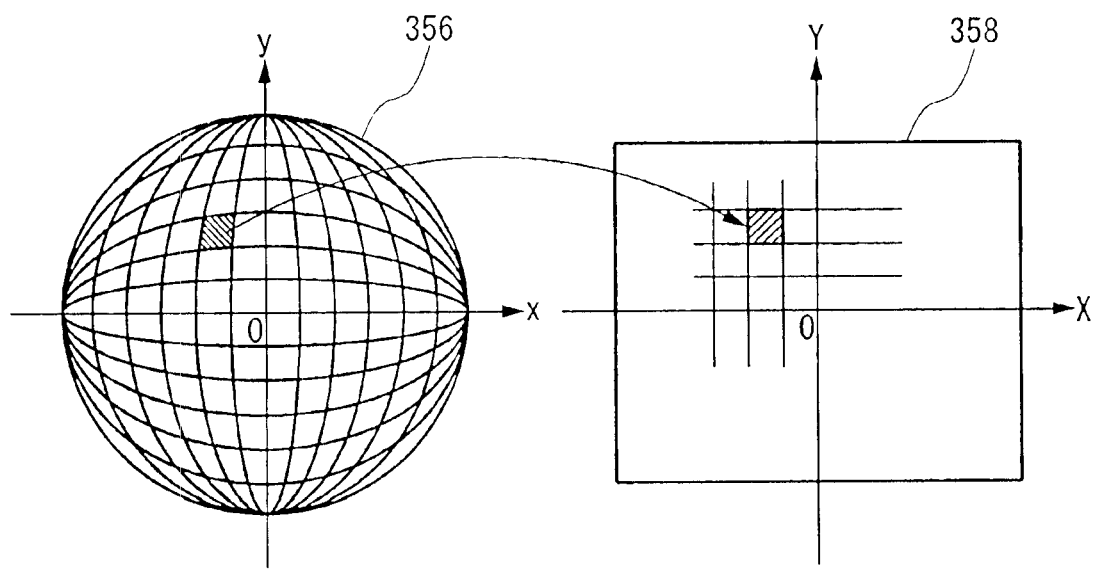
FIG. 25 shows the transformation from a whole azimuth angle image to a perspective projection image.

The image transformer 312 may transform a whole azimuth angle image of the object captured by the fish-eye lens into a perspective projection image, based on the depth information of the object. Reference is made to FIG. 25 in describing the transformation from the whole azimuth angle image to the perspective projection image. By a coordinate transformation of the depth amount of a point or of a region in the whole azimuth angle image 356 the point or the region can be mapped on the perspective projection image 358. This perspective projection image 358 corresponds to the image of the object formed by a regular lens.

Figure 26:
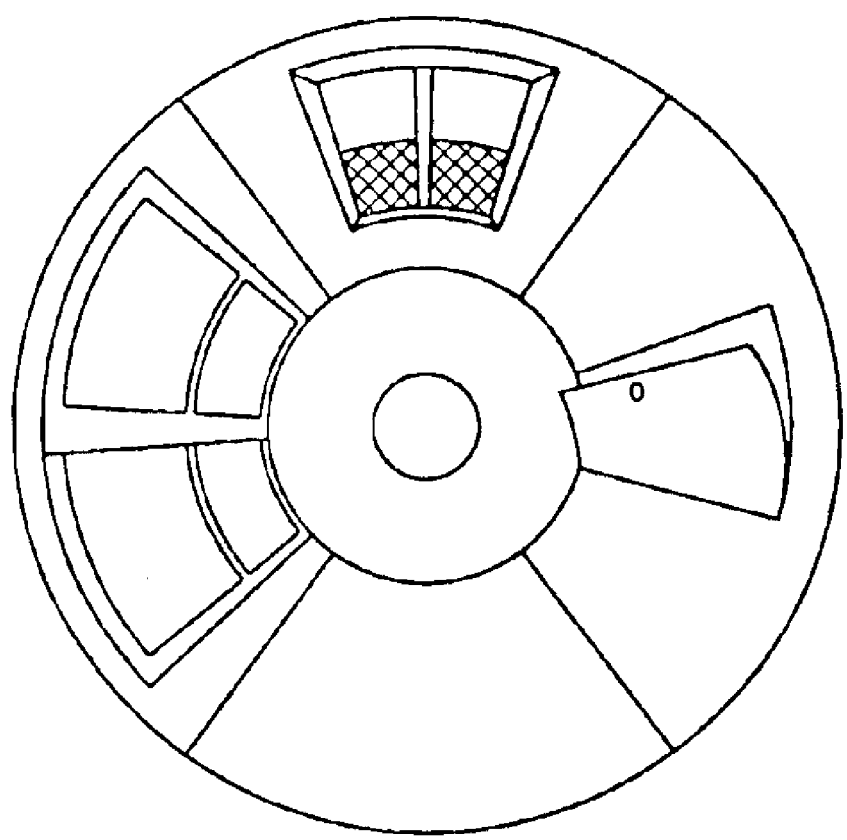
FIG. 26 shows the arrangement of a room captured by a fish-eye lens.
Figure 27:
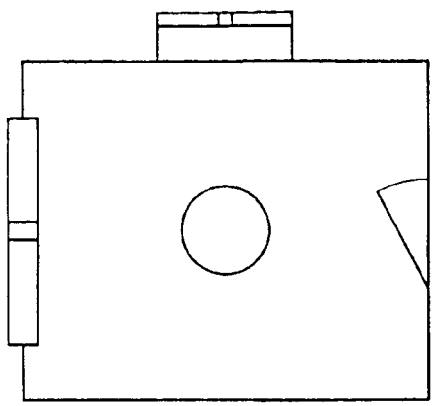
FIG. 27 is a plan view of the room obtained from the whole azimuth angle image by the coordinates transformation.
Figure 28:
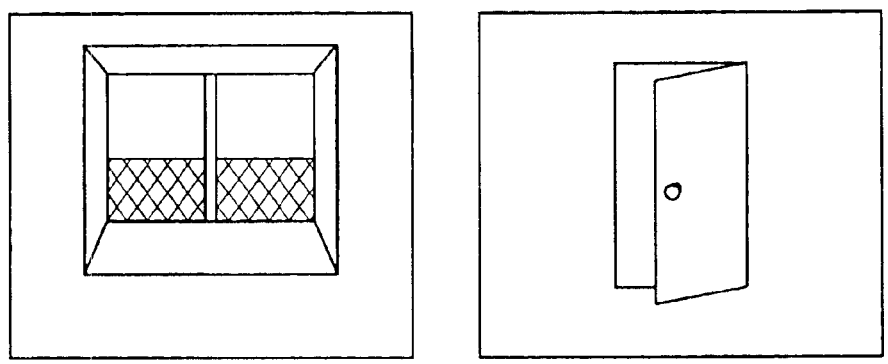
FIG. 28 is an orthographic projection image of the room obtained from the whole azimuth angle image by the coordinates transformation.
Figure 28:
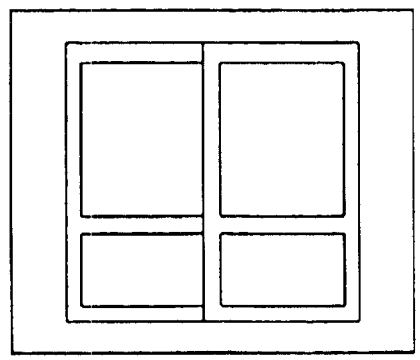

The image transformer 312 may make an orthographic projection image such as a front plan view image, a side plan view image or a an upper plan view image, based on the depth information of the object, out of the whole azimuth image of the object captured by the fish-eye lens. FIG. 26 shows an arrangement of a room captured by a fish-eye lens. The fish-eye lens is capturing the whole azimuth of the room as viewed from the ceiling. FIG. 27 is a plan view of the room obtained from the whole azimuth angle image by the coordinates transformation. By making use of the depth information of the whole azimuth of the room, the whole azimuth image can be transformed into such a plan view image. FIG. 28 is a side plan view image of the room obtained from the whole azimuth angle image by the coordinates transformation. As described above, the image transformer 312 forms an orthographic projection image such as a front plan view image, a side plan view image or a an upper plan view image, from the whole azimuth image, based on the depth information of the whole azimuth of the object and, therefore, it is useful in drawing designs or plans. The image transformation processing is generally used for architecture and urban planning.

According to the image processing apparatus of the present embodiment, the parallactic images of the object captured by a lens having a wide visual angle, and the depth information of the object through the wide visual field can be calculated. Furthermore, based on the depth information thus calculated, image processing can be carried out, and the data of the drawing, such as a CAD, can be formed. The image data together with the depth information through the whole azimuth can be used for CGs (computer graphics) or simulations.

Third Embodiment

A third embodiment of the present invention will be explained with reference to FIG. 29 which shows an image processing apparatus. The fundamental structure and operations of the image processing apparatus according to the present embodiment are similar to those of the second embodiment. The present embodiment is different from the second one in using a computer, such as a personal computer or a work station, to serve as the processor 220 of the image processing apparatus.

Figure 29:
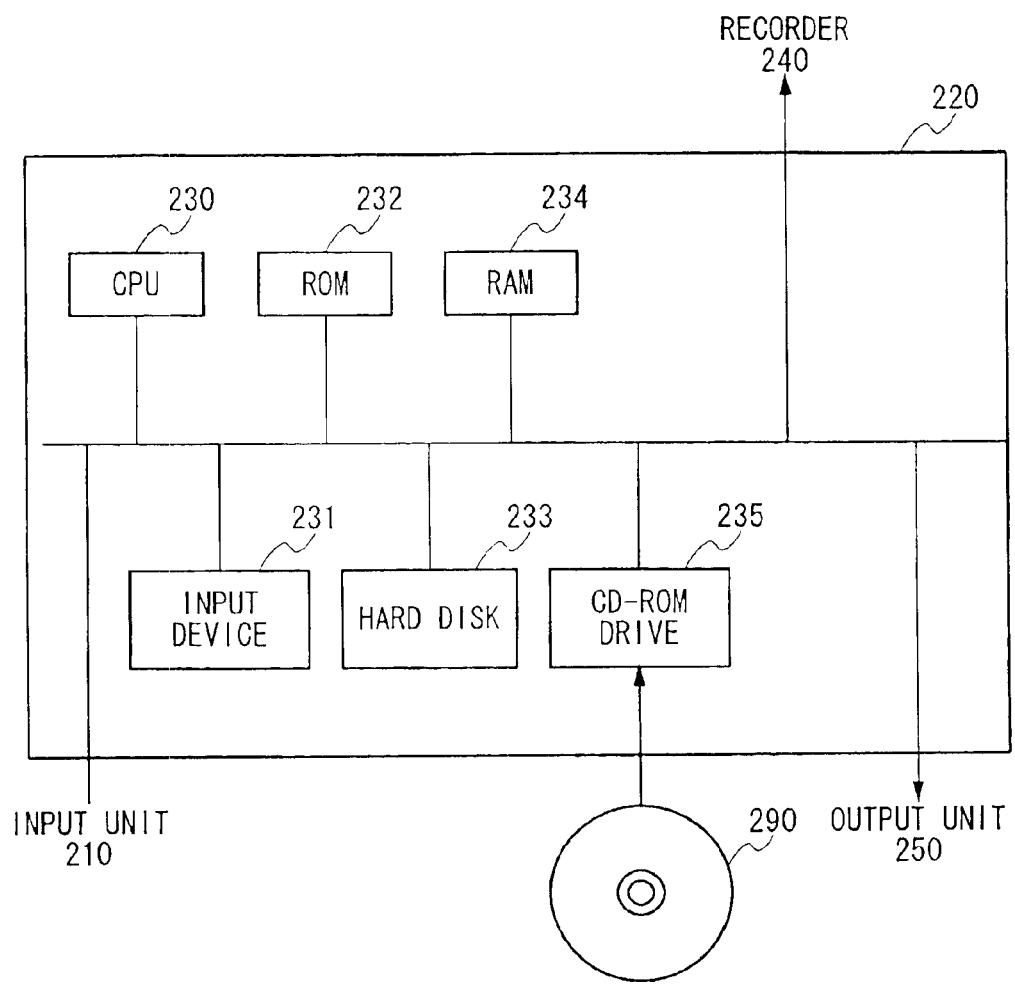
FIG. 29 shows schematically an image processing apparatus.

In FIG. 29, the hardware structure of the processor 220 of the present embodiment will be described. A CPU 230 works based on programs stored in a ROM 232 and a RAM 234. An input device 231, such as a keyboard or a mouse, carries out input of data by a user. A hard disk 233 stores image data and a program for making the CPU 230 work. A CD-ROM drive 235 reads out the data or the program, and brings it to at least one of the RAM 234, the hard disk 233 and the CPU 230.

The functional structure of the program which the CPU 230 executes is similar to the processor 220 of the image processing apparatus of the second embodiment, and includes a parallactic image storing module, a displacement detecting module, a depth calculating module and an image converting module.

The respective processing which a parallactic image storing module, a displacement detecting module, a depth calculating module and an image converting module make the CPU 230 execute correspond to the functions and the operations of the parallactic image storing section 302, the displacement detector 304, the depth calculator 308 and an image transformer 312 of the processor 220 of the image processing apparatus according to the second embodiment, and therefore detailed descriptions is not provided here. These programs, which are stored in a recording medium, for instance the CD-ROM 290, are supplied to users. A part of the operations or all the functions of the image processing apparatus described in this specification can be stored in the CD-ROM serving as the recording medium.

The program described above may be read out directly to the RAM 234 and executed by the CPU 230. Alternatively, the above-described program may be installed in the hard disk 233, read out to the RAM 234, and executed by the CPU 230.

A hard disk, a memory such as a ROM or a RAM, an optical recording medium such as a DVD or a PD, a magneto optical recording medium such as an MO, a tape recording medium, or a non-volatile semiconductor memory card is available as a recording medium in addition to the CD-ROM 290.

The program described above may be stored either in a single recording medium, or in plural recording media for divided pieces thereof. Moreover, it is possible to store the above-described program in compressed form. As well, it is possible to uncompress the compressed program, read it out to another recording medium such as the RAM 234, and execute it. Furthermore, the program can be read out to another recording medium such as the RAM 234, and executed, after the compressed program is uncompressed by the CPU 230 and installed in the hard disk 233 or the like.

Still further, the CD-ROM 290 can store therein the above-described program which is provided by a host computer through a communication network. As well, the above-described program stored in a recording medium can be stored in a hard disk of a host computer, transmitted on a communication network from the host computer to the client computer, read out to another recording medium such as the RAM 234, and executed.

Any recording medium storing the above-described program , which is used to produce the image processing apparatus and method according to the present invention, would be included in the scope of the disclosure hereof.

Fourth Embodiment

A fourth embodiment of the present invention will be described. A notebook size computer with a built-in camera or a mobile electrical terminal with a built-in camera is an example of an image capturing apparatus according to the present embodiment. In these cases, a computer section of the notebook size computer or of the mobile electrical terminal operates mainly as the processor 220, as shown in FIG. 29. The image capturing apparatus of the present embodiment is the image capturing apparatus of the first embodiment, but the processing unit 60 is replaced with the hardware structure of the processor 220 shown in FIG. 29. The fundamental structure and operations of the image capturing apparatus according to the present embodiment are similar to those of the first embodiment.

The hardware structure of the processor 220 of the present embodiment is similar to that of the third embodiment, and detailed descriptions are not provided here. The functional structure of the program which the CPU 230 executes is similar to the processing unit 60 of the image capturing apparatus of the first embodiment, and includes a parallactic image storing module, a displacement detecting module, a depth calculating module and a recording module.

The processing which a parallactic image storing module, a displacement detecting module, a depth calculating module and a recording module make the CPU 230 execute respectively correspond to the functions and the operations of the parallactic image storing section 302, the displacement detector 304, the depth calculator 308 and a recorder 310 of the processor 220 of the image capturing apparatus of the first embodiment, and therefore detailed descriptions are not provided here. These programs, which are stored in a recording medium, for instance the CD-ROM 290, are supplied to users. A part of the operations or all the functions of the image processing apparatus described in this specification can be stored in the CD-ROM serving as the recording medium.

Any recording medium storing the above-described program that is used only to produce the image capturing apparatus and method according to the present invention, would be within the scope of the present invention hereof.

As described above, the image capturing apparatus and the image processing apparatus of the present invention can capture three or more parallactic images of an object viewed from three or more viewpoints, detect plural displacement amounts of the images of the object, and find the depth amount of the object based on the plural displacement amounts. Even in the dead angle region where calculation of the depth amount is difficult based on a pair of parallactic images viewed from two of the viewpoints, the combination of the parallactic image viewed from the third viewpoint can overcome the dead angle region, and consequently the depth information of the object can be calculated through a wide visual field with a high degree of accuracy.

According to the present invention, the depth information of the object can be obtained throughout a wide visual field with a high degree of accuracy.

Although the present invention has been described by way of exemplary embodiments, it should be understood that many changes and substitutions may be made by those skilled in the art without departing from the spirit and the scope of the present invention which is defined only by the appended claims.

What is claimed is:

1. An imaging apparatus for obtaining depth information of an object to be imaged, comprising:
   an image capturing section for capturing three or more parallactic images of the object viewed from three or more different viewpoints which are not arrayed in a line;
   a displacement detector for detecting plural displacements with respect to images of a specific region of the object, each displacement being detected between any two of the three or more parallactic images; and
   a depth calculator for calculating depth information with respect to the specific region, based on the plural displacements detected by the displacement detector wherein the depth calculator has predetermined ratios for consideration of the plural displacements to calculate the depth information, and, for each specific region of the changes the consideration ratios.

2. The imaging apparatus as claimed in claim 1, wherein the depth calculator changes the consideration ratios depending on an azimuth of the specific region of the object viewed from near a center position of the three or more viewpoints.

3. The imaging apparatus as claimed in claim 2, wherein the depth calculator gives a consideration smaller ratio to the displacement detected between a particular pair from the three or more parallactic images, viewed from a corresponding pair from the three or more viewpoints, if the specific region of the object is nearer a line being drawn between the corresponding pair of the viewpoints, and the depth calculator gives a greater consideration ratio to the displacement if the specific region is nearer a plane which includes a middle point of a line segment drawn between the corresponding pair of viewpoints and is perpendicular to the line segment between the corresponding pair of viewpoints.

4. The imaging apparatus as claimed in claim 2, wherein, if an angle of the azimuth of the specific region of the object is less than 30 degree when viewed from a middle point between a particular pair from the three or more viewpoints, the depth calculator calculates the depth information based on the displacement detected between the corresponding parallactic images viewed from said pair of viewpoints.

5. The imaging apparatus as claimed in claim 1, wherein the viewpoints comprise three viewpoints, and the three viewpoints define a regular triangle.

6. The imaging apparatus as claimed in claim 1, wherein the image capturing section includes three or more optical lenses having a wide visual angle and being located at respective three or more viewpoints, the three or more parallactic images being captured by the three or more optical lenses.

7. The imaging apparatus as claimed in claim 6, wherein each of the three or more optical lenses has an optical axis, and directions of the optical axes of the three or more optical lenses are substantially identical.

8. The imaging apparatus as claimed in claim 6, wherein the three or more optical lenses comprise fish-eye lenses, and the depth calculator calculates the depth information through a whole azimuth of the object captured by the fish-eye lenses of the image capturing section.

9. The imaging apparatus as claimed in claim 6, having three viewpoints arranged to define a regular triangle.

10. The imaging apparatus as claimed in claim 1, wherein the image capturing section includes:
    an optical lens having a wide visual angle; and
    a driver for moving the optical lens to the three or more viewpoints, wherein the image capturing section captures the three or more parallactic images when the driver moves the optical lens to the three or more viewpoints.

11. The imaging apparatus as claimed in claim 10, wherein the optical lens has an optical axis, and all directions of the optical axis of the optical lens at the three or more viewpoints are substantially identical.

12. The imaging apparatus as claimed in claim 10, wherein the optical lens comprises a fish-eye lens, and the depth calculator calculates the depth information through a whole azimuth of the object captured by the fish-eye lens of the image capturing section.

13. The imaging apparatus as claimed in claim 10, wherein the driver moves the optical lens so as for a movement locus of the optical lens to define a circle, and wherein the three or more viewpoints are located on the circle of the movement locus.

14. The imaging apparatus as claimed in claim 13, wherein the viewpoints comprise three viewpoints located on the circle of the movement locus, the three viewpoints defining a regular triangle.

15. The imaging apparatus as claimed in claim 1, wherein the image capturing section includes:
    two optical lenses positioned at two different viewpoints of the three or more viewpoints, each of the optical lenses having a wide visual angle; and
    a driver for moving either one of the two optical lenses to another one of the three or more viewpoints which is not on a line drawn between the two different viewpoints, wherein the image capturing section captures parallactic images of the object by the two optical lenses and, when the driver moves the either one of the two optical lenses, captures the other parallactic images.

16. The imaging apparatus as claimed in claim 15, wherein the other viewpoint to which the driver moves the either of the two optical lenses is the third viewpoint, and the two viewpoints before moving and the third viewpoint form a regular triangle.

17. The imaging apparatus as claimed in claim 15, wherein each of the two optical lenses has an optical axis, and all directions of the optical axes of the two optical lenses at the three or more viewpoints are substantially identical.

18. The imaging apparatus as claimed in claim 15, wherein the two optical lenses comprise fish-eye lenses, and the depth calculator calculates the depth information through a whole azimuth of the object captured by the fish-eye lenses of the image capturing section.

19. An image processing apparatus for obtaining depth information of an object to be imaged, comprising:
    an input unit for inputting three or more parallactic images of the object viewed from three or more viewpoints which are not arrayed in a line;
    a displacement detector for detecting plural displacements of any pair from the three or more parallactic images with respect to a specific region of the object; and a depth calculator for calculating depth information of the specific region of the object, wherein ratios for consideration of the plural displacements are changed with respect to the specific region.

20. The image processing apparatus according to claim 19, further comprising:
an image transformer for transforming the images of the object inputted by the input unit, wherein the image transformer subjects the images to a coordinates transformation based on the depth information calculated by the depth calculator with respect to the specific region of the object.

21. The image processing apparatus as claimed in claim 20, wherein, if the image inputted by the input unit is a whole azimuth image captured by a fish-eye lens, the image transformer transforms the whole azimuth image into a perspective projection image by the coordinates transformation.

22. The image processing apparatus as claimed in claim 20, wherein the image transformer generates an orthogonal projection image of the object by the coordinates transformation.

23. A method for processing an image to obtain depth information of an object to be imaged, comprising steps of:
inputting three or more parallactic images of the object viewed from three or more different viewpoints which are not arrayed in a line;
detecting plural displacements with respect to a specific region of the object, each displacement being detected between any two of the three or more parallactic images; and
calculating depth information of the specific region of the object, wherein ratios for consideration of the plural displacements are changed with respect to the specific region.

24. A recording medium storing a computer program for obtaining depth information of an object to be imaged, comprising:
an input module for inputting three or more parallactic images of the object viewed from three or more different viewpoints which are not arrayed in a line;
a displacement detecting module for detecting plural displacements with respect to a specific region of the object, each displacement being detected between any two of the three or more parallactic images; and
a depth calculating module for calculating depth information of the specific region of the object, wherein ratios for consideration of the plural displacements are changed with respect to the specific region.

25. A system for determining distance from an object for generating an image of said object, comprising:
at least one lens for capturing three or more images of the object, said images being captured from corresponding positions of said at least one lens which are not arrayed in a line;
a displacement detector for detecting a plurality of parallactic displacements, each displacement being detected with respect to two of said three or more images; and
a depth calculator for calculating a distance from said object based upon the plurality of parallactic displacements detected by the displacement detector wherein ratios for consideration of the plural parallactic displacements are changed with respect to a specific region.

26. The system as claimed in claim 25, wherein said displacement detector detects said plurality of parallactic displacements with respect to images of corresponding regions of the object; said two of said three or more images corresponding to each displacement are selected so as to provide a largest displacement with respect to a corresponding region thereof; and said distance from said object is calculated by a distribution of distances from said object, each distance of said distribution corresponding to a region of said regions of the object.

27. The system as claimed in claim 25, wherein said displacement detector detects said plurality of parallactic displacements with respect to images of a corresponding region of the object; said depth calculator includes ratios of how much each one of said plurality of parallactic displacements is to be considered in calculating a distance from said corresponding region of the object; and said distance is calculated based upon said ratios of said parallactic displacements.

28. The system as claimed in claim 25, wherein said displacement detector detects said plurality of parallactic displacements with respect to images of a corresponding region of the object; said depth calculator calculates respective distances from said corresponding region based on said plurality of parallactic displacements; and a distance from said corresponding region of the object is calculated by a weighted mean of said respective distances based upon said parallactic displacements.

29. The system as claimed in claim 25, wherein said displacement detector detects said plurality of parallactic displacements with respect to images of a corresponding region of the object; and said depth calculator calculates a distance from said corresponding region of the object based upon a parallactic displacement having a highest detection accuracy of said plurality of parallactic displacements.

30. The system as claimed in claim 25, wherein said displacement detector detects said plurality of parallactic displacements with respect to images of a corresponding region of the object; said depth calculator calculates an initial distance from said corresponding region of the object based upon a parallactic displacement having a highest detection accuracy of said plurality of parallactic displacements and determines ratios of how much each one of said plurality of parallactic displacements is to be considered in calculating a final distance from said corresponding region of the object, said ratios being determined based upon an azimuth angle of said corresponding region and said initial distance from said corresponding region, wherein said final distance is calculated based upon said ratios of said parallactic displacements.

31. The system as claimed in claim 25, wherein said system includes an imaging apparatus.

32. The system as claimed in claim 25, wherein said system includes an image processing apparatus.

33. The system as claimed in claim 25, wherein said system includes a computer.

* * * * *